US006627364B2

(12) United States Patent
Kiguchi et al.

(10) Patent No.: US 6,627,364 B2
(45) Date of Patent: *Sep. 30, 2003

(54) INK JET COLOR FILTER RESIN COMPOSITION, COLOR FILTER AND COLOR FILTER PRODUCTION PROCESS

(75) Inventors: Hiroshi Kiguchi, Suwa (JP); Satoru Miyashita, Suwa (JP); Toshio Nakamura, Tokyo (JP); Tsuyoshi Watanabe, Tokyo (JP)

(73) Assignees: Seiko Epson Corporation, Tokyo (JP); JSR Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/558,595

(22) Filed: Apr. 26, 2000

(65) Prior Publication Data

US 2002/0128351 A1 Sep. 12, 2002

(30) Foreign Application Priority Data

Apr. 27, 1999 (JP) ............................................. 11-120529

(51) Int. Cl.$^7$ .......................... G02B 5/20; C09D 11/10; C08L 39/04; C08L 33/02; C08L 33/10
(52) U.S. Cl. ........................ 430/7; 523/160; 524/548; 524/556; 524/560
(58) Field of Search ................................. 523/160, 161; 524/548, 555, 556, 560; 430/7, 20; 349/106, 110

(56) References Cited

U.S. PATENT DOCUMENTS

| 5,104,448 | A | | 4/1992 | Kruse | |
|---|---|---|---|---|---|
| 5,721,077 | A | * | 2/1998 | Takao et al. | 430/7 |
| 5,811,209 | A | * | 9/1998 | Eida et al. | 430/7 |
| 5,821,016 | A | * | 10/1998 | Satoh et al. | 430/7 |
| 5,866,298 | A | * | 2/1999 | Iwamoto et al. | 430/281.1 |
| 5,888,679 | A | * | 3/1999 | Suzuki et al. | 430/7 |
| 5,922,401 | A | * | 7/1999 | Kashiwazaki et al. | 427/164 |
| 5,948,576 | A | * | 9/1999 | Shirota et al. | 430/7 |
| 6,030,741 | A | * | 2/2000 | Doi et al. | 430/191 |
| 6,087,050 | A | * | 7/2000 | Itano et al. | 430/7 |
| 6,140,016 | A | * | 10/2000 | Suzuki et al. | 430/281.1 |
| 6,143,450 | A | * | 11/2000 | Sobue et al. | 430/7 |
| 6,177,214 | B1 | * | 1/2001 | Yokoyama et al. | 430/7 |
| 6,416,174 | B1 | * | 7/2002 | Ito et al. | 347/100 |

FOREIGN PATENT DOCUMENTS

| EP | 0 784 085 | | 7/1997 |
|---|---|---|---|
| JP | 59-75205 | | 4/1984 |
| JP | 61-245106 | | 10/1986 |
| JP | 63-235901 | | 9/1988 |
| JP | 4-261503 | | 9/1992 |
| JP | 7-318723 | | 12/1995 |
| JP | 8-259876 | | 10/1996 |
| JP | 09145913 | * | 6/1997 |
| JP | 10-86456 | | 4/1998 |

* cited by examiner

Primary Examiner—Vasu Jagannathan
Assistant Examiner—Callie E. Shosho
(74) Attorney, Agent, or Firm—Oblon, Spivak, McClelland, Maier & Neustadt, P.C.

(57) ABSTRACT

A resin composition for producing a color filter by an ink jet system contains (A) a colorant, (B) a binder resin and (c) a solvent having a boiling point of 245° C. or more at normal pressure, wherein the color filter is produced by discharging the above resin composition from an ink jet head into light transmitting regions on the surface of a transparent substrate having banks formed thereon to store the resin composition in the light transmitting regions defined by the banks; forming a pixel pattern by drying the resin composition stored in the light transmitting regions; and forming a protective layer to cover the pixel pattern.

14 Claims, 4 Drawing Sheets

INK JET COLOR FILTER RESIN COMPOSITION, COLOR FILTER AND COLOR FILTER PRODUCTION PROCESS

DETAILED DESCRIPTION OF THE INVENTION

The present invention relates to an ink jet color filter resin composition for the production of a color filter for use in color liquid crystal displays, color image pick-up elements and the like by an ink jet system, a color filter having a pixel pattern formed from the color filter resin composition by an ink jet system and a process for producing a color filter from the color filter resin composition by an ink jet system.

A color filter for use in color liquid crystal displays (LCD) and the like is incorporated in a color liquid crystal display or the like and serves to improve picture quality and provide a primary color to each pixel.

Known processes for producing such a color filter include one in which a coating film of a radiation sensitive resin is exposed to radiation through a photomask to cure exposed portions, the exposed portions are developed to remove radiation unexposed portions of the coating film so as to form a pattern and the pattern is dyed (dyeing process) and a photography process in which a composition comprising a red, green or blue colorant dispersed in a radiation sensitive resin is used to form a coating film, and the coating film is exposed to radiation and developed as described above. However, these processes involve such problems that the pixel pattern forming step is complicated and the cost is high.

JP-A 59-75205, JP-A 61-245106 and JP-A 63-235901 (the term "JP-A" as used herein means an "unexamined published Japanese patent application") disclose processes for producing a color filter by an ink jet system comprising the step of forming the pigmented layer of a color filter with an ink jet head. In these processes, the control of a position for discharging droplets of a color filter resin composition is easy and a waste of the resin composition is small, thereby making it possible to reduce production cost.

However, the above conventional processes for producing a color filter by an ink jet system may have such a problem that the color density of a color filter resin composition discharged becomes nonuniform. Therefore, JP-A 4-261503 and JP-A 7-318723 propose methods for suppressing non-uniformity in the color density of a pixel pattern by controlling the discharge of a color filter composition.

In these publications, thorough studies are not made on the composition suitable for an ink jet system of a color filter resin composition and details of a color filter production process are not fully disclosed.

The inventors of the present invention have studied in detail the behavior in the color filter production process of a color filter resin composition used for the production of a color filter by an ink jet system and have found it necessary to reduce the drying speed of liquid drops of the color filter resin composition when it is discharged, suppress an excessive rise in the viscosity of liquid drops by drying and prevent the deposition of a solid content in order to discharge liquid drops of the color filter resin composition linearly by preventing a used ink jet head from being clogged because the area of each pixel pattern forming a color filter is very small.

The present invention has been made based on the above finding in view of the above situation of the prior art.

It is therefore an object of the present invention to provide a color filter resin composition which can simplify the step of forming a pixel pattern and is optimized for the production of an inexpensive color filter by an ink jet system.

It is another object of the present invention to provide a color filter having a pixel pattern formed from the above color filter resin composition by an ink jet system.

It is a further object of the present invention to provide a process for producing a color filter from the color filter resin composition by an ink jet system.

Other objects and advantages of the present invention will become apparent from the following description.

According to the present invention, firstly, the above objects and advantages of the present invention are attained by an ink jet color filter resin composition (to be referred to as "first composition of the present invention" hereinafter) which comprises (A) a colorant, (B) a binder resin and (C) a solvent having a boiling point of 245° C. or more at normal pressure.

According to the present invention, secondly, the above objects and advantages of the present invention are attained by an ink jet color filter resin composition (to be referred to as "second composition of the present invention" hereinafter) which comprises (A) a colorant, (B) a binder resin and (C) a solvent having a boiling point of 245° C. or more at normal pressure and which has a contact angle between it and a pixel bank formed from a resin composition for forming a color filter bank of 40° or more.

According to the present invention, thirdly, the above objects and advantages of the present invention are attained by color filter having a pixel pattern formed by an ink jet system from an ink jet color filter resin composition which comprises (A) a colorant, (B) a binder resin and (C) a solvent having a boiling point of 245° C. or more at normal pressure or an ink jet color filter resin composition which comprises the above components (A), (B) and (C) and has a contact angle between it and a bank formed from a resin composition for forming a bank of 40° or more.

According to the present invention, fourthly, the above objects and advantages of the present invention are attained by a process for producing a color filter from the above resin composition of the present invention by an ink jet system, comprising:

the step of discharging the above resin composition from an ink jet head into light transmitting regions on the surface of a transparent substrate having banks formed thereon to store the resin composition in the light transmitting regions defined by the banks;

the step of forming a pixel pattern by drying the resin composition stored in the light transmitting regions; and the step of forming a protective layer to cover the pixel pattern.

Figure 1A:
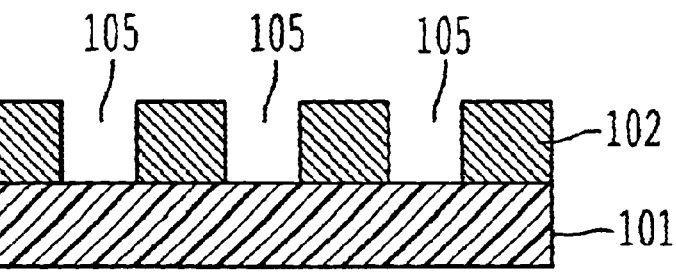
FIG. 1 are longitudinal sectional views showing the key parts of an example of color filter production process of the present invention, wherein (a) shows the step of forming banks, (b) shows the step of forming a pixel pattern, (c) shows the step of drying, (d) shows the step of forming a protective layer and (e) shows the step of forming a common electrode.
Figure 1B:
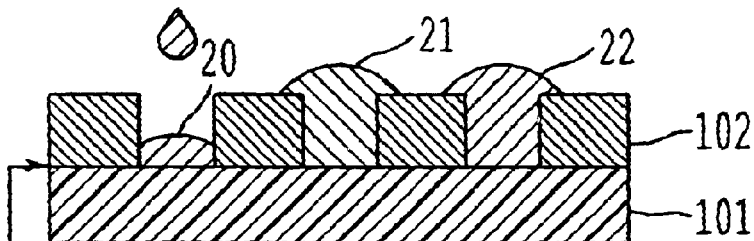
Figure 1C:
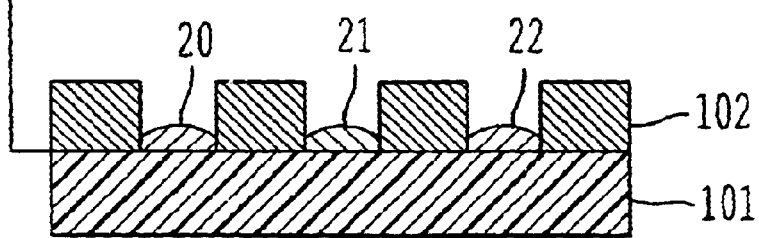
Figure 1D:
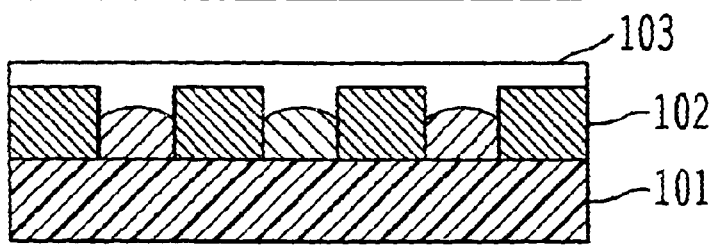
Figure 1E:
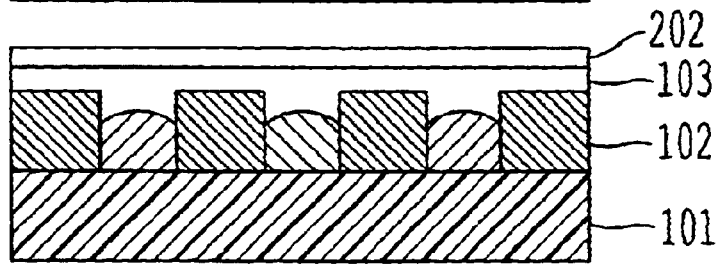

The present invention will be described in detail hereinunder.

(A) colorant

The colorant used in the present invention is not limited to a particular color. It is suitably selected according to the application purpose of the obtained color filter and may be a pigment, dye or natural coloring matter.

Since high-definition color development and heat resistance are required of a color filter, the colorant in the present invention is preferably a colorant having high color developability and high heat resistance, particularly preferably a colorant having high thermal decomposition resistance. A pigment is generally used and an organic pigment is particularly preferably used.

Illustrative examples of the organic pigment are compounds classified into a group of pigments according to color index (C.I.; The Society of Dyers and Colourists), specifically compounds having the following color index (C.I.) numbers:

C.I. Pigment Yellow 83, C.I. Pigment Yellow 110, C.I. Pigment Yellow 138, C.I. Pigment Yellow 139, C.I. Pigment Yellow 150, C.I. Pigment Yellow 155, C.I. Pigment Orange 71, C.I. Pigment Red 48:1, C.I. Pigment Red 48:2, C.I. Pigment Red 48:3, C.I. Pigment Red 48:4, C.I. Pigment Red 122, C.I. Pigment Red 177, C.I. Pigment Red 202, C.I. Pigment Red 206, C.I. Pigment Red 207, C.I. Pigment Red 209, C.I. Pigment Red 224, C.I. Pigment Red 254, C.I. Pigment Blue 15:3, C.I. Pigment Blue 15:4, C.I. Pigment Blue 15:6;

C.I. Pigment Green 7, C.I. Pigment Green 36;

C.I. Pigment Brown 23, C.I. Pigment Brown 25;

C.I. Pigment Black 1, C.I. Pigment Black 7.

These organic pigments may be used alone or in admixture of two or more.

The organic pigment may be purified by a sulfuric acid recrystallization method, a solvent washing method or a combination thereof.

Illustrative examples of the inorganic pigment include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black, synthetic iron black and carbon black.

These inorganic pigments may be used alone or in admixture of two or more.

The surface of the colorant particle in the present invention may be modified with a polymer as required. The polymer for modifying the surface of the colorant is a polymer disclosed by JP-A 8-259876, or a commercially available polymer or oligomer for dispersing a pigment, or the like.

The colorant in the present invention can be used in combination with a dispersant as required.

The dispersant is, for example, a cationic, anionic, nonionic or amphoteric surfactant, or a silicone-based or fluorine-based surfactant.

Illustrative examples of the surfactant include polyoxyethylene alkyl ethers such as polyoxyethylene lauryl ether, polyoxyethylene stearyl ether and polyoxyethylene oleyl ether; polyoxyethylene alkylphenyl ethers such as polyoxyethylene n-octylphenyl ether and polyoxyethylene n-nonylphenyl ether; polyethylene glycol diesters such as polyethylene glycol dilaurate and polyethylene glycol distearate; sorbitan fatty acid esters; fatty acid modified polyesters; tertiary amine modified polyurethanes; and polyethyleneimines. They are available on the market under the trade names of KP (Shin-Etsu Chemical Co., Ltd.), Polyflow (Kyoeisha Chemical Co., Ltd.), F-Top (Tohkem Products Corporation), Megafac (Dainippon Ink and Chemicals, Inc.), Florade (Sumitomo 3M Limited), Asahi Guard and Surflon (Asaki Glass Co., Ltd.), Disperbyk (BYK-Chemie GmbH) and Solsperse (Zeneca Ltd.).

These surfactants may be used alone or in admixture of two or more.

The surfactant is preferably used in an amount of 50 parts or less by weight, more preferably 30 parts or less by weight based on 100 parts by weight of the colorant.

(B) Binder Resin

Any resin may be used as the binder resin in the present invention if it serves as a binder for the colorant (A).

The binder resin preferred in the present invention is a carboxyl group-containing copolymer or N-substituted maleimide copolymer. The former copolymer is a polymer containing a carboxyl group, particularly a copolymer (to be referred to as "carboxyl group-containing copolymer (B1)" hereinafter) of an ethylenic unsaturated monomer having at least one carboxyl group in the molecule (to be simply referred to as "carboxyl group-containing unsaturated monomer" hereinafter) and other copolymerizable ethylenic unsaturated monomer having no carboxyl group in the molecule (to be referred to as "other unsaturated monomer (b1)" hereinafter).

Illustrative examples of the carboxyl group-containing unsaturated monomer include unsaturated monocarboxylic acids such as acrylic acid, methacrylic acid, crotonic acid, α-chloroacrylic acid and cinnamic acid; unsaturated dicarboxylic acids (anhydrides) such as maleic acid, maleic anhydride, fumaric acid, itaconic acid, itaconic anhydride, citraconic acid, citraconic anhydride and mesaconic acid; unsaturated polycarboxylic acids (anhydrides) having at least three carboxyl groups in the molecule; mono[(meth) acryloyloxyalkyl] esters of polycarboxylic acids having at least two carboxyl groups in the molecule such as mono(2-acryloyloxyethyl)succinate, mono(2-methacryloyloxyethyl) succinate, mono(2-acryloyloxyethyl)phthalate and mono(2-methacryloyloxyethyl)phthalate; and mono(meth) acrylates of polymers having a carboxyl group and a hydroxyl group at both terminals such as ω-carboxy-polycaprolactone monoacrylate and ω-carboxy-polycaprolactone monomethacrylate.

Mono(2-acryloyloxyethyl)succinate and mono(2-acryloyloxyethyl)phthalate are available on the market under the trade names of M-5300 and M-5400 (of Toagosei Chemical Industry, Co., Ltd.), respectively.

These carboxyl group-containing ethylenic unsaturated monomers may be used alone or in admixture of two or more.

Illustrative examples of the other unsaturated monomer (b1) include aromatic vinyl compounds such as styrene, α-methylstyrene, o-vinyltoluene, m-vinyltoluene, p-vinyltoluene, p-chlorostyrene, o-methoxystyrene, m-methoxystyrene, p-methoxystyrene, o-vinylbenzyl methyl ether, m-vinylbenzyl methyl ether, p-vinylbenzyl methyl ether, o-vinylbenzyl glycidyl ether, m-vinylbenzyl glycidyl ether and p-vinylbenzyl glycidyl ether; indenes such as indene and 1-methylindene; unsaturated carboxylates such as methyl acrylate, methyl methacrylate, ethyl acrylate, ethyl methacrylate, n-propyl acrylate, n-propyl methacrylate, i-propyl acrylate, i-propyl methacrylate, n-butyl acrylate, n-butyl methacrylate, i-butyl acrylate, i-butyl methacrylate, sec-butyl acrylate, sec-butyl methacrylate, t-butyl acrylate, t-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, allyl acrylate, allyl methacrylate, benzyl acrylate, benzyl methacrylate, cyclohexyl acrylate, cyclohexyl methacrylate, phenyl acrylate, phenyl methacrylate, 2-methoxyethyl acrylate, 2-methoxyethyl methacrylate, 2-phenoxyethyl acrylate, 2-phenoxyethyl methacrylate, methoxydiethylene glycol acrylate, methoxydiethylene glycol methacrylate, methoxytriethylene glycol acrylate, methoxytriethylene glycol methacrylate, methoxypropylene glycol acrylate, methoxypropylene glycol methacrylate, methoxydipropylene glycol acrylate, methoxydipropylene glycol methacrylate, isobornyl acrylate, isobornyl methacrylate, dicyclopentadienyl acrylate, dicyclopentadienyl methacrylate, 2-hydroxy-3-phenoxypropyl acrylate, 2-hydroxy-3-phenoxypropyl methacrylate, glycerol monoacrylate and glycerol monomethacrylate; unsaturated aminoalkyl carboxylates such as 2-aminoethyl acrylate, 2-aminoethyl methacrylate, 2-dimethylaminoethyl acrylate, 2-dimethylaminoethyl methacrylate, 2-aminopropyl acrylate, 2-aminopropyl methacrylate, 2-dimethylaminopropyl acrylate, 2-dimethylaminopropyl methacrylate, 3-aminopropyl acrylate, 3-aminopropyl methacrylate, 3-dimethylaminopropyl acrylate and 3-dimethylaminopropyl methacrylate; unsaturated glycidyl carboxylates such as glycidyl acrylate and glycidyl methacrylate; vinyl carboxylates such as vinyl acetate, vinyl propionate, vinyl butyrate and vinyl benzoate; unsaturated ethers such as vinylmethyl ether, vinylethyl ether, allyl glycidyl ether and methallyl glycidyl ether; vinyl cyanide compounds such as acrylonitrile, methacrylonitrile, α-chloroacrylonitrile and vinylidene cyanide; unsaturated amides and unsaturated imides such as acrylamide, methacrylamide, α-chloroacrylamide, N-2-hydroxyethyl acrylamide, N-2-hydroxyethyl methacrylamide and maleimide; aliphatic conjugated dienes such as 1,3-butadiene, isoprene and chloroprene; and macromonomers having a monoacryloyl group or monomethacryloyl group at the terminal of a polymer molecular chain such as polystyrene, polymethyl acrylate, polymethyl methacrylate, poly-n-butyl acrylate, poly-n-butyl methacrylate and polysiloxane.

These other unsaturated monomers (b1) may be used alone or in admixture of two or more.

The carboxyl group-containing copolymer (B1) is preferably a copolymer of (1) acrylic acid and/or methacrylic acid and (2) at least one selected from the group consisting of styrene, methyl acrylate, methyl methacrylate, 2-hydroxyethyl acrylate, 2-hydroxyethyl methacrylate, benzyl acrylate, benzyl methacrylate, polystyrene macromonomer and polymethyl methacrylate macromonomer.

Preferred examples of the carboxyl group-containing copolymer (B1) include acrylic acid copolymers such as a copolymer of acrylic acid and benzyl acrylate, copolymer of acrylic acid, styrene and methyl acrylate, copolymer of acrylic acid, styrene and benzyl acrylate, copolymer of acrylic acid, methyl acrylate and polystyrene macromonomer, copolymer of acrylic acid, methyl acrylate and polymethyl methacrylate macromonomer, copolymer of acrylic acid, benzyl acrylate and polystyrene macromonomer, copolymer of acrylic acid, benzyl acrylate and polymethyl methacrylate macromonomer, copolymer of acrylic acid, 2-hydroxyethyl acrylate, benzyl acrylate and polystyrene macromonomer, copolymer of acrylic acid, 2-hydroxyethyl acrylate, benzyl acrylate and polymethyl methacrylate monomer, copolymer of acrylic acid and benzyl methacrylate, copolymer of acrylic acid, styrene and methyl methacrylate, copolymer of acrylic acid, styrene and benzyl methacrylate, copolymer of acrylic acid, methyl methacrylate and polystyrene macromonomer, copolymer of acrylic acid, methyl methacrylate and polymethyl methacrylate macromonomer, copolymer of acrylic acid, benzyl methacrylate and polystyrene macromonomer, copolymer of acrylic acid, benzyl methacrylate and polymethyl methacrylate macromonomer, copolymer of acrylic acid, 2-hydroxyethyl methacrylate, benzyl methacrylate and polystyrene macromonomer and copolymer of acrylic acid, 2-hydroxyethyl methacrylate, benzyl methacrylate and polymethyl methacrylate macromonomer; and methacrylic acid copolymers such as a copolymer of methacrylic acid and benzyl acrylate, copolymer of methacrylic acid, styrene and methyl acrylate, copolymer of methacrylic acid, styrene and benzyl acrylate, copolymer of methacrylic acid, methyl acrylate and polystyrene macromonomer, copolymer of methacrylic acid, methyl acrylate and polymethyl methacrylate macromonomer, copolymer of methacrylic acid, benzyl acrylate and polystyrene macromonomer, copolymer of methacrylic acid, benzyl acrylate and polymethyl methacrylate macromonomer, copolymer of methacrylic acid, 2-hydroxyethyl acrylate, benzyl acrylate and polystyrene macromonomer, copolymer of methacrylic acid, 2-hydroxyethyl acrylate, benzyl acrylate and polymethyl methacrylate macromonomer, copolymer of methacrylic acid and benzyl methacrylate, copolymer of methacrylic acid, styrene and methyl methacrylate, copolymer of methacrylic acid, styrene and benzyl methacrylate, copolymer of methacrylic acid, methyl methacrylate and polystyrene macromonomer, copolymer of methacrylic acid, methyl methacrylate and polymethyl methacrylate macromonomer, copolymer of methacrylic acid, benzyl methacrylate and polystyrene macromonomer, copolymer of methacrylic acid, benzyl methacrylate and polymethyl methacrylate macromonomer, copolymer of methacrylic acid, 2-hydroxyethyl methacrylate, benzyl methacrylate and polystyrene macromonomer and copolymer of methacrylic acid, 2-hydroxyethyl methacrylate, benzyl methacrylate and polymethyl methacrylate macromonomer.

Out of these carboxyl group-containing copolymers (B1), a copolymer of methacrylic acid and benzyl methacrylate, copolymer of methacrylic acid, styrene and methyl methacrylate, copolymer of methacrylic acid, styrene and benzyl methacrylate, copolymer of methacrylic acid, methyl methacrylate and polystyrene macromonomer, copolymer of methacrylic acid, methyl methacrylate and polymethyl methacrylate macromonomer, copolymer of methacrylic acid, benzyl methacrylate and polystyrene macromonomer, copolymer of methacrylic acid, benzyl methacrylate and polymethyl methacrylate macromonomer, copolymer of methacrylic acid, 2-hydroxyethyl methacrylate, benzyl methacrylate and polystyrene macromonomer and copolymer of methacrylic acid, 2-hydroxyethyl methacrylate, benzyl methacrylate and polymethyl methacrylate macromonomer are particularly preferred.

The proportion of the carboxyl group-containing unsaturated monomer in the carboxyl group-containing copolymer (B1) is preferably 5 to 50 wt %, more preferably 10 to 40 wt %.

The carboxyl group-containing copolymers (B1) may be used alone or in admixture of two or more in the present invention.

The other preferred binder resin in the present invention is an N-substituted maleimide copolymer. This copolymer is a copolymer (to be referred to as "N-substituted maleimide copolymer (B2)" hereinafter) of an N-substituted maleimide and other copolymerizable ethylenic unsaturated monomer (to be referred to as "other unsaturated monomer (b2)" hereinafter).

The N-substituent of the N-substituted meleimide is a (cyclo)alkyl group having 1 to 20 carbon atoms, aryl group having 6 to 30 carbon atoms, aralkyl group having 7 to 30 carbon atoms or substituted derivative thereof. Out of these N-substituents, an aryl group having 6 to 20 carbon atoms and substituted derivatives thereof are preferred.

Illustrative examples of the N-substituted maleimide include N-(cyclo)alkyl-substituted maleimides and substituted derivatives thereof such as N-methylmaleimide, N-ethylmaleimide, N-n-propylmaleimide, N-i-propylmaleimide, N-n-butylmaleimide, N-t-butylmaleimide, N-n-pentylmaleimide, N-n-hexylmaleimide, N-cyclohexylmaleimide, N-4-methylcyclohexylmaleimide and N-4-chlorocyclohexylmaleimide; N-aryl-substituted maleimides and substituted derivatives thereof such as N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-p-methoxyphenylmaleimide, N-p-methoxyphenylmaleimide and N-p-chlorophenylmaleimide; and N-aralkyl-substituted maleimides and substituted derivatives thereof such as N-benzylmaleimide, N-phenethylmaleimide, N-o-hydroxybenzylmaleimide, N-m-hydroxybenzylmaleimide, N-p-hydroxybenzylmaleimide, N-o-methylbenzylmaleimide, N-m-methylbenzylmaleimide, N-p-methylbenzylmaleimide, N-o-methoxybenzylmaleimide, N-m-methoxybenzylmaleimide, N-p-methoxybenzylmaleimide and N-p-chlorobenzylmaleimide.

Out of these N-substituted maleimides, N-cyclohexylmaleimide, N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-m-methoxyphenylmaleimide and N-p-methoxyphenylmaleimide are preferred.

The above N-substituted maleimides may be used alone or in admixture of two or more.

The other unsaturated monomer (b2) is not limited to a particular kind if it can be copolymerized with an N-substituted maleimide. It is preferably a monomer mixture of at least one of the above carboxyl group-containing unsaturated monomers and at least one of the above other unsaturated monomers (b1).

The N-substituted maleimide copolymer (B2) is preferably an N-phenylmaleimide copolymer, more preferably a copolymer of N-phenylmaleimide, carboxyl group-containing unsaturated monomer and other unsaturated monomer (b1), particularly preferably a copolymer of (1) N-phenylmaleimide, (2) acrylic acid and/or methacrylic acid, (3) styrene and (4) at least one selected from the group consisting of methyl acrylate, methyl methacrylate, 2-hydroxyethyl acrylate, 2-hydroxyethyl methacrylate, allyl acrylate, allyl methacrylate, benzyl acrylate, benzyl methacrylate, phenyl acrylate, phenyl methacrylate, polystyrene macromonomer and polymethyl methacrylate macromonomer.

Preferred examples of the N-substituted maleimide copolymer (B2) include a copolymer of N-phenylmaleimide, methacrylic acid, styrene and allyl acrylate, copolymer of N-phenylmaleimide, methacrylic acid, styrene and allyl methacrylate, copolymer of N-phenylmaleimide, methacrylic acid, styrene and benzyl methacrylate, copolymer of N-phenylmaleimide, methacrylic acid, styrene and phenyl methacrylate, copolymer of N-phenylmaleimide, methacrylic acid, styrene, benzyl methacrylate and polystyrene macromonomer, copolymer of N-phenylmaleimide, methacrylic acid, styrene, benzyl methacrylate and polymethyl methacrylate macromonomer, copolymer of N-phenylmaleimide, methacrylic acid, styrene, phenyl methacrylate and polystyrene macromonomer, copolymer of N-phenylmaleimide, methacrylic acid, styrene, phenyl methacrylate and polymethyl methacrylate macromonomer, copolymer of N-phenylmaleimide, methacrylic acid, styrene, 2-hydroxyethyl methacrylate, benzyl methacrylate and polystyrene macromonomer, copolymer of N-phenylmaleimide, methacrylic acid, styrene, 2-hydroxyethyl methacrylate, benzyl methacrylate and polymethyl methacrylate macromonomer, copolymer of N-phenylmaleimide, methacrylic acid, styrene, 2-hydroxyethyl methacrylate, phenyl methacrylate and polystyrene macromonomer, and copolymer of N-phenylmaleimide, methacrylic acid, styrene, 2-hydroxyethyl methacrylate, phenyl methacrylate and polymethyl methacrylate macromonomer.

The proportion of the N-substituted maleimide in the N-substituted maleimide copolymer (B2) is preferably 5 to 50 wt %, more preferably 10 to 40 wt %.

When the N-substituted maleimide copolymer is a copolymer of an N-substituted maleimide, carboxyl group-containing unsaturated monomer and other unsaturated monomer (b1), the proportion of the carboxyl group-containing unsaturated monomer is preferably 5 to 50 wt %, more preferably 10 to 40 wt % and the proportion of the other unsaturated monomer (b1) is preferably 10 to 90 wt %, more preferably 20 to 80 wt %.

In the present invention, the N-substituted maleimide copolymers (B2) may be used alone or in admixture of two or more.

The weight average molecular weight (to be simply referred to as "the weight average molecular weight" hereinafter) in terms of polystyrene measured by gel permeation chromatography (GPC; tetrahydrofuran used as an elution solvent) of each resin component forming the binder resin in the present invention is preferably 3,000 to 300,000, particularly preferably 5,000 to 100,000.

The amount of the binder resin in the present invention is preferably 10 to 1,000 parts by weight, more preferably 20 to 500 parts by weight based on 100 parts by weight of the colorant (A). When the amount of the binder resin is less than 10 parts by weight, the discharge stability of the color filter resin composition and the hardness of the formed pixels tend to lower and when the amount of the binder resin is more than 1,000 parts by weight, the concentration of the colorant lowers relatively, thereby making it difficult to attain the targeted color density as a thin film.

(C) Solvent

The solvent in the present invention is a solvent having a boiling point at normal pressure (1 atm.) (to be simply referred to as "boiling point" hereinafter) of 245° C. or more. The boiling point of the high-boiling solvent is preferably 250° C. or more, more preferably 260° C. or more, particularly preferably 270° C. or more. The upper limit of boiling point of the high-boiling solvent is not particularly limited if a color filter can be produced from the ink jet color filter resin composition of the present invention by an ink jet system. However, the solvent is desirably a high-boiling liquid solvent having a boiling point of preferably 290° C. or less, more preferably 280° C. or less and relatively low viscosity at normal temperature (20° C.) from the viewpoint of operation ease in the step of preparing a resin composition and the step of producing a color filter. Therefore, the boiling point of the high-boiling solvent of the present invention is preferably in the range of 250 to 290° C., more preferably 260 to 290° C., particularly preferably 270 to 280° C.

Illustrative examples of the high-boiling solvent include diethylene glycol dialkyl ether-based solvents represented by the formula $R^1$—O($CH_2CH_2O)_2$—$R^2$ (wherein $R^1$ and $R^2$ are each independently an alkyl group having 4 to 10 carbon atoms); triethylene glycol dialkyl ether-based solvents represented by the formula $R^3$—O($CH_2CH_2O)_3$—$R^4$ (wherein $R^3$ and $R^4$ are each independently an alkyl group having 1 to 10 carbon atoms); polyethylene glycol dialkyl ether-based solvents represented by the formula $R^5$—O($CH_2CH_2O)_i$—$R^6$ (wherein $R^5$ and $R^6$ are each independently an alkyl group having 1 to 10 carbon atoms, and i is an integer of 4 to 30); propylene glycol dialkyl ether-based solvents represented by the formula $R^7$—OCH($CH_3$)$CH_2O$—$R^8$ (wherein $R^7$ and $R^8$ are each independently an alkyl group having 4 to 10 carbon atoms); and ester-based solvents such as glycerin triacetate, di-n-butyl maleate, di-n-butyl fumarate, n-butyl benzoate, dimethyl phthalate, diethyl phthalate, di-n-propyl phthalate, di-i-propyl phthalate, di-n-butyl phthalate and i-amyl salicylate.

Preferred examples of the high-boiling solvent in the present invention include ether-based solvents such as diethylene glycol di-n-butyl ethers, tetraethylene glycol dimethyl ethers, pentaethylene glycol dimethyl ethers, hexaethylene glycol dimethyl ethers, propylene glycol di-n-butyl ethers and butylcarbitol acetate. Out of these, tetraethylene glycol dimethyl ethers (boiling point of 275° C.) are particularly preferred.

The above high-boiling solvents may be used alone or in admixture of two or more.

The amount of the high-boiling solvent is preferably 100 to 10,000 parts by weight, more preferably 1,000 to 10,000 parts by weight, particularly preferably 2,000 to 5,000 parts by weight based on 100 parts by weight of the binder resin (B).

The following effects (1) to (3) can be obtained by using the high-boiling solvent in the present invention.

(1) When a pixel pattern is to be formed by an ink jet system, the color filter resin composition is discharged into a light transmitting region such that it stands up above the upper end of a bank and dried to form a pixel pattern in the light transmitting region defined by the banks. As the evaporation speed of the high-boiling solvent is low and the top shape of the discharged resin composition does not change rapidly at the time of drying, the work margin improves at the time of forming a pixel pattern.

(2) When a pixel pattern is to be formed by an ink jet system, the color filter resin composition becomes viscous gradually by the evaporation of the solvent. Since the boiling point of the solvent is low, a change in viscosity becomes large, whereby a change in the top shape of the resin composition discharged into the light transmitting region becomes large at the beginning and the end of the pixel pattern forming step, thereby making difficult the formation of a pixel pattern. In contrast to this, use of a high-boiling solvent can suppress this viscosity change and makes it easy to form a pixel pattern having a desired shape.

(3) The ink jet head for discharging the color filter resin composition can be prevented from being clogged by drying and the resin composition can be prevented from being curved by the drying of the ink jet head when it is discharged, thereby making it possible to secure the excellent linearity of the resin composition. Therefore, the use efficiency of the color filter resin composition and the cleaning efficiency of a color filter production apparatus are improved.

In the present invention, a solvent having a boiling point lower than 245° C. (to be referred to as "low-boiling solvent" hereinafter) may be used in conjunction with a high-boiling solvent as required.

Illustrative examples of the low-boiling solvent include ethylene glycol monoalkyl ethers such as ethylene glycol monomethyl ether and ethylene glycol monoethyl ether; ethylene glycol monoalkyl ether acetates such as ethylene glycol monomethyl ether acetate and ethylene glycol monoethyl ether acetate; diethylene glycol monoalkyl ethers such as diethylene glycol monomethyl ether and diethylene glycol monoethly ether; diethylene glycol monoalkyl ether acetates such as diethylene glycol monomethyl ether acetate and diethylene glycol monoethly ether acetate; propylene glycol monoalkyl ether acetates such as propylene glycol monomethyl ether acetate and propylene glycol monoethly ether acetate; other ethers such as n-butyl diglycol acetate, diethylene glycol dimethyl ether, diethylene glycol diethyl ether, benzyl ethyl ether, dihexyl ether and tetrahydrofuran; alcohols such as 1-octanol, 1-nonanol and benzyl alcohol; ketones such as methyl ethyl ketone, cyclohexanone, 2-heptanone, 3-heptanone, acetonylacetone and isophorone; carboxylic acids such as caproic acid and caprylic acid; alkyl lactates such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoic acid, 3-methyl-3-methoxybutyl acetate, 3-methyl-3-methoxybutyl propionate, ethyl acetate, n-butyl acetate, isobutyl acetate, n-amyl formate, isoamyl acetate, butyl propionate, ethyl butyrate, isopropyl butyrate, n-butyl butyrate, methyl pyruvate, ethyl pyruvate, n-propyl pyruvate, methyl acetoacetate, ethyl acetoacetate, ethyl 2-oxobutanoic acid, benzyl acetate, ethyl benzoate, diethyl oxalate, diethyl maleate, γ-butyrolactone, ethylene carbonate and propylene carbonate; and aromatic hydrocarbons such as toluene and xylene.

These low-boiling solvents may be used alone or in admixture of two or more.

The proportion of the low-boiling solvent is preferably 20 wt % or less, preferably 5 wt % or less based on the total of the high-boiling solvent and the low-boiling solvent. When the proportion of the low-boiling solvent is more than 20 wt %, desired effects expected from the use of a high-boiling solvent may be impaired.

Polyfunctional Monomer

The ink jet color filter resin composition in the present invention may contain a polyfunctional monomer having at least two polymerizable unsaturated bonds as a crosslinkable monomer component.

Illustrative examples of the above polyfunctional monomer include diacrylates and dimethacrylates of alkylene glycols such as ethylene glycol and propylene glycol; diacrylates and dimethacrylates of polyalkylene glycols such as polyethylene glycol and polypropylene glycol; polyacrylates and polymethacrylates of polyhydric alcohols having at least 3 hydroxyl groups such as glycerin, trimethylolpropane, pentaerythritol and dipentaerythritol, and carboxylic acid modified products thereof; oligoacrylates and oligomethacrylates such as polyesters, epoxy resins, urethane resins, alkyd resins, silicone resins and spiran resins; diacrylates and dimethacrylates of both-terminal hydroxylated polymers such as both-terminal hydroxypolybutadiene, both-terminal hydroxypolyisoprene and both-terminal hydroxypolycaprolactone; and tris(2-acryloyloxyethyl) phosphate and tris(2-methacryloyloxyethyl)phosphate.

Out of these polyfunctional monomers, preferred are polyacrylates and polymethacrylates of polyhydric alcohols having at least 3 hydroxyl groups and carboxylic acid modified products thereof such as trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate and compounds represented by the following formula (1):

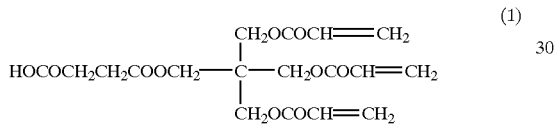
(1)

Particularly preferred are trimethylolpropane triacrylate, dipentaerythritol pentaacrylate and dipentaerythritol hexaacrylate because they provide pixels having high strength and excellent surface smoothness.

The above polyfunctional monomers may be used alone or in admixture of two or more.

The amount of the polyfunctional monomer in the present invention is preferably 500 parts or less by weight, more preferably 20 to 300 parts by weight based on 100 parts by weight of the binder resin (B). When the amount of the polyfunctional monomer is larger than 500 parts by weight, ink dischargeability is liable to lower.

A monofunctional monomer having one polymerizable unsaturated bond may be used in combination with the above polyfunctional monomer in the present invention.

Illustrative examples of the monofunctional monomer include methoxyethylene glycol acrylate, methoxydiethylene glycol acrylate, methoxytriethylene glycol acrylate, methoxyethylene glycol methacrylate, methoxydiethylene glycol methacrylate, methoxytriethylene glycol methacrylate, methoxypropylene glycol acrylate, methoxydipropylene glycol acrylate, methoxypropylene glycol methacrylate, methoxydipropylene glycol methacrylate, 2-hydroxy-3-phenoxypropyl acrylate, 2-hydroxy-3-phenoxypropyl methacrylate, 2-acryloyloxyethyl succinate, 2-methacryloyloxyethyl succinate, ω-carboxypolycaprolactone monoacrylate, ω-carboxypolycaprolactone monomethacrylate and the like. The commercially available products of the monofunctional monomer include M-5300 and M-5400 (trade name, manufactured by Toagosei Chemical Industry, Ltd.).

These monofunctional monomers may be used alone or in admixture of two or more.

The amount of the monofunctional monomer is preferably 90 wt % or less, more preferably 50 wt % or less based on the total of the polyfunctional monomer and the monofunctional monomer.

Photopolymerization Initiator

A photopolymerization initiator is blended into the ink jet color filter resin composition in the present invention to provide radiation curability to the resin composition.

The term "radiation" as used herein embraces visible radiation, ultraviolet radiation, far ultraviolet radiation, X-radiation, electron beams and the like.

The photopolymerization initiator is preferably a component containing at least one biimidazole-based compound selected from the group consisting of compounds represented by the following formula (2) (to be referred to as "biimidazole-based compounds (2)" hereinafter):

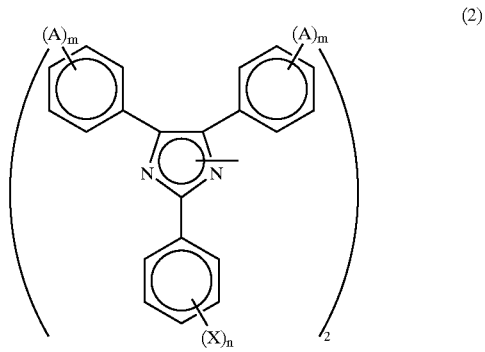
(2)

wherein X is a hydrogen atom, halogen atom, cyano group, alkyl group having 1 to 4 carbon atoms and aryl group having 6 to 9 carbon atoms, a plurality of X's may be the same or different, A is —COOR (R is an alkyl group having 1 to 4 carbon atoms or aryl group having 6 to 9 carbon atoms), a plurality of A's may be the same or different, m is an integer of 1 to 3, and n is an integer of 1 to 3, and compounds represented by the following formula (3) (to be referred to as "biimidazole-based compounds (3)" hereinafter):

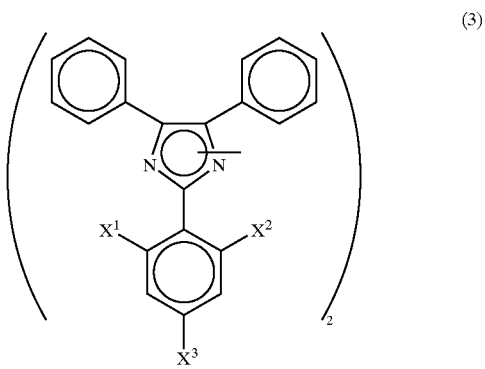
(3)

wherein $X^1$, $X^2$ and $X^3$ are each independently a hydrogen atom, halogen atom, cyano group, alkyl group having 1 to 4 carbon atoms or aryl group having 6 to 9 carbon atoms, with the proviso that two or more of $X^1$, $X^2$ and $X^3$ cannot be a hydrogen atom at the same time.

In the above formulas (2) and (3), examples of the halogen atom represented by X, $X^1$, $X^2$ and $X^3$ include chlorine atom, bromine atom, iodine atom and the like, examples of the alkyl group having 1 to 4 carbon atoms include methyl group, ethyl group, n-propyl group, i-propyl group, n-butyl group, i-butyl group, sec-butyl group, t-butyl group and the like, and examples of the aryl group having 6 to 9 carbon atoms include phenyl group, o-tolyl group, m-tolyl group, p-tolyl group and the like.

In the above formula (2), R in —COOR represented by A is the same alkyl group having 1 to 4 carbon atoms or aryl group having 6 to 9 carbon atoms as those enumerated for X.

The above formulas (2) and (3) generally show such a structure that two imidazole units are bonded to each other at the 1-position or 2-position. Therefore, the biimidazole-based compound (2) and the biimidazole-based compound (3) are one of compounds having main skeletons represented by the following formulas (4) to (6) or a mixture thereof.

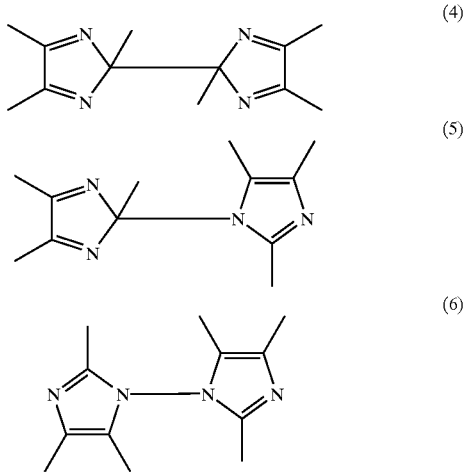

Illustrative examples of the biimidazole-based compound (2) and the biimidazole-based compound (3) are given below.

Those of the biimidazole-based compound (2) include 2,2'-bis(2-chlorophenyl)-4,4',5,5'-tetrakis(4-methoxycarbonylphenyl)-1,2'-biimidazole, 2,2'-bis(2-chlorophenyl)-4,4',5,5'-tetrakis(4-ethoxycarbonylphenyl)-1,2'-biimidazole, 2,2'-bis(2-chlorophenyl)-4,4',5,5'-tetrakis(4-phenoxycarbonylphenyl)-1,2'-biimidazole, 2,2'-bis(2,4-dichlorophenyl)-4,4',5,5'-tetrakis(4-methoxycarbonylphenyl)-1,2'-biimidazole, 2,2'-bis(2,4-dichlorophenyl)-4,4',5,5'-tetrakis(4-ethoxycarbonylphenyl)-1,2'-biimidazole, 2,2'-bis(2,4-dichlorophenyl)-4,4',5,5'-tetrakis(4-phenoxycarbonylphenyl)-1,2'-biimidazole, 2,2'-bis(2,4,6-trichlorophenyl)-4,4',5,5'-tetrakis(4-methoxycarbonylphenyl)-1,2'-biimidazole, 2,2'-bis(2,4,6-trichlorophenyl)-4,4',5,5'-tetrakis(4-ethoxycarbonylphenyl)-1,2'-biimidazole, 2,2'-bis(2,4,6-trichlorophenyl)-4,4',5,5'-tetrakis(4-phenoxycarbonylphenyl)-1,2'-biimidazole, 2,2'-bis(2-cyanophenyl)-4,4',5,5'-tetrakis(4-methoxycarbonylphenyl)-1,2'-biimidazole, 2,2'-bis(2-cyanophenyl)-4,4',5,5'-tetrakis(4-ethoxycarbonylphenyl)-1,2'-biimidazole, 2,2'-bis(2-cyanophenyl)-4,4',5,5'-tetrakis(4-phenoxycarbonylphenyl)-1,2'-biimidazole, 2,2'-bis(2-methylphenyl)-4,4'5,5'-tetrakis(4-methoxycarbonylphenyl)-1,2'-biimidazole, 2,2'-bis(2-methylphenyl)-4,4',5,5'-tetrakis(4-ethoxycarbonylphenyl)-1,2'-biimidazole, 2,2'-bis(2-methylphenyl)-4,4',5,5'-tetrakis(4-phenoxycarbonylphenyl)-1,2'-biimidazole, 2,2'-bis(2-ethylphenyl)-4,4',5,5'-tetrakis(4-methoxycarbonylphenyl)-1,2'-biimidazole, 2,2'-bis(2-ethylphenyl)-4,4',5,5'-tetrakis(4-ethoxycarbonylphenyl)-1,2'-biimidazole, 2,2'-bis(2-ethylphenyl)-4,4',5,5'-tetrakis(4-phenoxycarbonylphenyl)-1,2'-biimidazole, 2,2'-bis(2-phenylphenyl)-4,4',5,5'-tetrakis(4-methoxycarbonylphenyl)-1,2'-biimidazole, 2,2'-bis(2-phenylphenyl)-4,4',5,5'-tetrakis(4-ethoxycarbonylphenyl)-1,2'-biimidazole, 2,2'-bis(2-phenylphenyl)-4,4',5,5'-tetrakis(4-phenoxycarbonylphenyl)-1,2'-biimidazole, and the like.

Those of the biimidazole-based compound (3) include 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-tribromophenyl)-4,4',5,5'-tetraphenyl-1,2'-biimidazole, 2,2'-bis(2,4-dicyanophenyl)-4,4',5,5'-tetraphenyl-1,2'-biimidazole, 2,2'-bis(2,4,6-tricyanophenyl)-4,4',5,5'-tetraphenyl-1,2'-biimidazole, 2,2'-bis(2,4-dimethylphenyl)-4,4',5,5'-tetraphenyl-1,2'-biimidazole, 2,2'-bis(2,4,6-trimethylphenyl)-4,4',5,5'-tetraphenyl-1,2'-biimidazole, 2,2'-bis(2,4-diethylphenyl)-4,4',5,5'-tetraphenyl-1,2'-biimidazole, 2,2'-bis(2,4,6-triethylphenyl)-4,4',5,5'-tetraphenyl-1,2'-biimidazole, 2,2'-bis(2,4-diphenylphenyl)-4,4',5,5'-tetraphenyl-1,2'-biimidazole, 2,2'-bis(2,4,6-triphenylphenyl)-4,4',5,5'-tetraphenyl-1,2'-biimidazole, and the like.

Out of these, the biimidazole-based compound (2) is particularly preferably 2,2'-bis(2-chlorophenyl)-4,4',5,5'-tetrakis(4-ethoxycarbonylphenyl)-1,2'-biimidazole or 2,2'-bis(2-bromophenyl)-4,4',5,5'-tetrakis(4-ethoxycarbonyphenyl)-1,2'-biimidazole. Out of these, the biimidazole-based compound (3) is particularly preferably 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2,4-dibromophenyl)-4,4',5,5'-tetraphenyl-1,2'-biimidazole or 2,2'-bis(2,4,6-tribromophenyl)-4,4',5,5'-tetraphenyl-1,2'-biimidazole.

The biimidazole-based compound (2) and the biimidazole-based compound (3) have excellent solubility in a solvent and rarely produce foreign matter such as an undissolved product and precipitate. In addition, they have high sensitivity, fully promotes a curing reaction by exposure to radiation with a small amount of energy, provide high contrast and do not cause a curing reaction in an unexposed portion. Therefore, an excellent color filter can be formed by using the above biimidazole-based compounds.

In the present invention, the biimidazole-based compounds (2) and the biimidazole-based compounds (3) may be used alone or in admixture of two or more independently or in combination.

The total amount of the biimidazole-based compound (2) and the biimidazole-based compound (3) in the present invention is preferably 50 parts or less by weight, more preferably 0.5 to 30 parts by weight, particularly preferably 0.5 to 10 parts by weight based on 100 parts by weight of the binder resin (B) when a polyfunctional monomer is not used. When a polyfunctional monomer is used, the total amount is preferably 0.01 to 200 parts by weight, more preferably 1 to 120 parts by weight, particularly preferably 1 to 50 parts by weight based on 100 parts by weight of the polyfunctional monomer. Pixels having an excellent pattern shape and excellent adhesion to a substrate can be formed by controlling the total amount of these compounds to the above range.

At least one selected from other photoradical generating agent, sensitizer, curing promoting agent and photo-crosslinking agent or photosensitizer composed of a polymer compound (to be referred to as "polymer photocrosslinking and sensitizing agent" hereinafter) may be used in combination with the above biimidazole-based compound (2)

and/or the biimidazole-based compound (3) as a photopolymerization initiator component.

Illustrative examples of the other photoradical generating agent include 2-hydroxy-2-methyl-1-phenylpropan-1-one, 1-(4-isopropylphenyl)-2-hydroxy-2-methylpropan-1-one, 4-(2-hydroxyethoxy)phenyl-(2-hydroxy-2-propyl)ketone, 1-hydroxycyclohexylphenyl ketone, 2,2-dimethoxy-2-phenylacetophenone, 2-methyl-(4-methylthiophenyl)-2-morpholino-1-propan-1-one, 2-benzyl-2-dimethylamino-1-(4-morpholinophenyl)butan-1-one, benzophenone, 4,4'-bis(dimethylamino)benzophenone, 4,4'-bis(diethylamino)benzophenone, 2,4-diethylthioxanthone, 3,3-dimethyl-4-methoxybenzophenone, 4-azidobenzaldehyde, 4-azidoacetophenone, 4-azidobenzalacetophenone, azidopyrene, 4-diazodiphenylamine, 4-diazo-4'-methoxydiphenylamine, 4-diazo-3-methoxydiphenylamine, bis(2,6-dimethoxybenzoyl)-2,4,4-trimethylpentylphosphine oxide, dibenzoyl, benzoin isobutyl ether, N-phenylthioacridone and triphenylpyrilium perchlorate.

These other photoradical generating agents may be used alone or in admixture of two or more.

Illustrative examples of the sensitizer include 4-diethylaminoacetophenone, 4-dimethylaminopropiophenone, ethyl-4-dimethylaminobenzoate, 2-ethylhexyl-1,4-dimethylaminobenzoate, 2,5-bis(4'-diethylaminobenzal)cyclohexanone, 7-diethylamino-3-(4-diethylaminobenzoyl)coumarin and 4-(diethylamino)chalcone.

These sensitizers may be used alone or in admixture of two or more.

Illustrative examples of the curing promoting agent include chain transfer agents such as 2-mercaptobenzoimidazole, 2-mercaptobenzothiazole, 2-mercaptobenzooxazole, 2,5-dimercapto-1,3,4-thiadiazole and 2-mercapto-4,6-dimethylaminopyridine.

These curing promoting agents may be used alone or in admixture of two or more.

Out of the above other photoradical generating agents, sensitizers and curing promoting agents, 2-hydroxy-2-methyl-1-phenylpropan-1-one, 2-methyl-(4-methylthiophenyl)-2-morpholino-1-propan-1-one, 2-benzyl-2-dimethylamino-1-(4-morpholinophenyl)butan-1-one, 4,4'-bis(dimethylamino)benzophenone, 4,4'-bis(diethylamino)benzophenone and 2-mercaptobenzothiazole are preferred because the formed pixels hardly fall off from the substrate at the time of development and have high strength and sensitivity.

In the present invention, the photopolymerization initiator is particularly preferably a combination of the biimidazole-based compound (2) and/or the biimidazole-based compound (3) and at least one selected from the group consisting of benzophenone-based and acetophenone-based other photoradical generating agents and thiazole-based curing promoting agents.

Illustrative examples of the particularly preferred combination include a combination of 2,2'-bis(2-chlorophenyl)-4,4',5,5'-tetrakis(4-ethoxycarbonylphenyl)biimidazole and 4,4'-bis(diethylamino)benzophenone; a combination of 2,2'-bis(2-chlorophenyl)-4,4',5,5'-tetrakis(4-ethoxycarbonylphenyl)biimidazole, 4,4'-bis(diethylamino)benzophenone and 2-benzyl-2-dimethylamino-1-(4-morpholinophenyl)butan-1-one; a combination of 2,2'-bis(2-chlorophenyl)-4,4',5,5'-tetrakis(4-ethoxycarbonylphenyl)biimidazole, 4,4'-bis(diethylamino)benzophenone and 1-hydroxycyclohexylphenyl ketone; a combination of 2,2'-bis(2-chlorophenyl)-4,4',5,5'-tetrakis(4-ethoxycarbonylphenyl)biimidazole, 4,4'-bis(dimethylamino)benzophenone, 1-hydroxycyclohexylphenyl ketone and 2-mercaptobenzothiazole; a combination of 2,2'-bis(2,4-dichlorophenyl)-4,4',5,5'-tetraphenylbiimidazole and 4,4'-bis(diethylamino)benzophenone; a combination of 2,2'-bis(2,4-dibromophenyl)-4,4',5,5'-tetraphenylbiimidazole, 4,4'-bis(diethylamino)benzophenone and 2-benzyl-2-dimethylamino-1-(4-morpholinophenyl)butan-1-one; a combination of 2,2'-bis(2,4-dibromophenyl)-4,4',5,5'-tetraphenylbiimidazole, 4,4'-bis(diethylamino)benzophenone and 1-hydroxycyclohexylphenyl ketone; and a combination of 2,2'-bis(2,4,6-trichlorophenyl)-4,4',5,5'-tetraphenylbiimidazole, 4,4'-bis(dimethylamino)benzophenone, 1-hydroxycyclohexylphenyl ketone and 2-mercaptobenzothiazole.

The amount of the other photoradical generating agent in the present invention is preferably 80 wt % or less based on the total amount of the photopolymerization initiator, and the total amount of the sensitizer and/or the curing promoting agent is preferably 80 wt % or less based on the total amount of the photopolymerization initiator.

The polymer photocrosslinking/sensitizing agent is a polymer compound having a functional group which can function as a photocrosslinking agent or photosensitizing agent in the main chain and/or side chain. Illustrative examples of the polymer photocrosslinking/sensitizing agent include a condensate of 4-azidobenzaldehyde and polyvinyl alcohol, condensate of 4-azidobenzaldehyde and phenol novolak resin, (co)polymer of cinnamic acid and 4-(meth)acryloylphenyl, 1,4-polybutadiene and 1,2-polybutadiene.

These polymer photocrosslinking/sensitizing agents may be used alone or in admixture of two or more.

The amount of the polymer photocrosslinking/sensitizing agent is preferably 200 parts or less by weight, more preferably 180 parts or less by weight based on 100 parts by weight of the total of the biimidazole-based compound (2) and/or the biimidazole-based compound (3).

Other Additives

The ink jet color filter resin composition of the present invention may contain various other additives as required.

The additives include, for example, a dispersion aid such as a blue pigment derivative exemplified by a copper phthalocyanine derivative or yellow pigment derivative; filler such as glass or alumina; polymer compound such as a polyvinyl alcohol, polyethylene glycol monoalkyl ether or polyfluoroalkyl acrylate; adhesion promoting agent such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane or 3-mercaptopropyltrimethoxysilane; antioxidant such as 2,2-thiobis(4-methyl-6-t-butylphenol) or 2,6-di-t-butylphenol; ultraviolet light absorber such as 2-(3-t-butyl-5-methyl-2-hydroxyphenyl)-5-chlorobenzotriazole or alkoxybenzophenone; coagulation preventing agent such as sodium polyacrylate; ink jet discharge stabilizing agent such as methanol, ethanol, i-propanol, n-butanol and glycerin; and surfactant available on the market under the trade name of F Top EF301, EF303 or EF352 (of Shin Akita Kasei Co., Ltd.), Megafac F171, F172, F173 or F178K (of Dainippon Ink and Chemicals, Inc.), Florade FC430 or FC431 (of Sumitomo 3M Limited), Asahi Guard AG710 or Surflon S-382, SC-101, SC-102, SC-103, SC-104, SC-105 or SC-106 (of Asahi Glass Co., Ltd.), KP341 (Shin-Etsu Chemical Co., Ltd.), and Polyflow No. 75 or No. 95 (Kyoeisha Chemical Co., Ltd.).

The ink jet color filter resin composition of the present invention may further contain a thermally acid generating agent and acid crosslinking agent.

The thermally acid generating agent is a component which generates an acid by heat, as exemplified by onium salts such as sulfonium salts, benzothiazolium salts, ammonium salts and phosphonium salts. Out of these, sulfonium salts and benzothiazolium salts are preferred.

The sulfonium salt is preferably a compound represented by the following formula (7) (to be referred to as "sulfonium salt (7)" hereinafter):

(7)

wherein $R^9$, $R^{10}$ and $R^{11}$ are each independently a monovalent hydrocarbon group having 1 to 5 carbon atoms or substituted derivative thereof, or aryl group having 6 to 10 carbon atoms or substituted derivative thereof, with the proviso that at least one of $R^9$, $R^{10}$ and $R^{11}$ is an aryl group having 6 to 10 carbon atoms or substituted derivative thereof, and $Y^-$ is a monovalent anion.

Illustrative examples of the sulfonium salt (7) include dialkylsulfonium salts such as 4-acetophenyldimethylsulfonium hexafluoroantimonate, 4-acetoxyphenyldimethylsulfonium hexafluoroarsenate, 4-benzyloxycarbonyloxyphenyldimethylsulfonium hexafluoroantimonate, 4-benzoyloxyphenyldimethylsulfonium hexafluoroantimonate, 4-benzoyloxyphenyldimethylsulfonium hexafluoroarsenate and 3-chloro-4-acetoxyphenyldimethylsulfonium hexafluoroantimonate; monobenzylsulfonium salts such as 4-hydroxyphenylbenzylmethylsulfonium hexafluoroantimonate, 4-hydroxyphenylbenzylmethylsulfonium hexafluorophosphate, 4-acetoxyphenylbenzylmethylsulfonium hexafluoroantimonate, 4-methoxyphenylbenzylmethylsulfonium hexafluoroantimonate, 2-methyl-4-hydroxyphenylbenzylmethylsulfonium hexafluoroantimonate and 3-chloro-4-hydroxyphenylbenzylmethylsulfonium hexafluoroarsenate; dibenzylsulfonium salts such as 4-hydroxyphenyldibenzylsulfonium hexafluoroantimonate, 4-hydroxyphenyldibenzylsulfonium hexafluorophosphate, 4-acetoxyphenyldibenzylsulfonium hexafluoroantimonate, 4-methoxyphenyldibenzylsulfonium hexafluoroantimonate, 3-chloro-4-hydroxyphenyldibenzylsulfonium hexafluoroarsenate and 3-methyl-4-hydroxy-5-t-butylphenyldibenzylsulfonium hexafluoroantimonate; and substituted benzylsulfonium salts such as 4-hydroxyphenyl.4-methoxybenzyl.methylsulfonium hexafluorophosphate, 4-hydroxyphenyl 4-chlorobenzyl.methylsulfonium hexafluoroantimonate, 4-hydroxyphenyl.4-nitrobenzyl.methylsulfonium hexafluoroantimonate, 4-hydroxyphenyl 4-chlorobenzyl.methylsulfonium hexafluorophosphate, 3-methyl-4-hydroxyphenyl 4-nitrobenzyl methylsulfonium hexafluoroantimonate, 4-hydroxyphenyl.3,5-dichlorobenzyl.methylsulfonium hexafluoroantimonate, 3-chloro-4-hydroxyphenyl.2-chlorobenzyl.methylsulfonium hexafluoroantimonate and 4-hdyroxyphenyl.benzyl 4-methoxybenzylsulfonium hexafluorophosphate.

Illustrative examples of the benzothiazolium salt include benzylbenzothiazolium salts such as 3-benzylbenzothiazolium hexafluoroantimonate, 3-benzylbenzothiazolium hexafluorophosphate, 3-benzylbenzothiazolium tetrafluoroborate, 3-(4-methoxybenzyl) benzothiazolium hexafluoroantimonate, 3-benzyl-2-methylthiobenzothiazolium hexafluoroantimonate and 3-benzyl-5-chlorobenzothiazolium hexafluoroantimonate.

Out of the above sulfonium salts (7) and the benzothiazolium salts, 4-acetoxyphenyldimethylsulfonium hexafluoroarsenate, 4-hydroxyphenyl.benzyl.methylsulfonium hexafluoroantimonate, 4-acetoxyphenyl.benzyl.methylsulfonium hexafluoroantimonate, 4-hydroxyphenyldibenzylsulfonium hexafluoroantimonate, 4-acetoxyphenyldibenzylsulfonium hexafluoroantimonate and 3-benzylbenzothiazolium hexafluoroantimonate are preferred. These compounds are available on the market under the trade names of Sunaide SI-L85, SI-L110, SI-L145, SI-L150 and SI-L160 (of Sanshin Kagaku Kogyo Co., Ltd.).

The above thermally acid generating agents may be used alone or in admixture of two or more.

The above acid crosslinking agent is preferably a compound having two or more monovalent organic groups (to be referred to as "methylol (ether) groups" hereinafter) represented by the following formula in the molecule:

wherein $R^{12}$ is a hydrogen atom or alkyl group having preferably 1 to 6 carbon atoms, more preferably 1 to 4 carbon atoms, more preferably a compound having monovalent organic groups bonded to nitrogen atoms, that is, a compound having N-methylol groups and/or N-alkoxymethyl groups. When the acid crosslinking agent has two or more methylol (ether) groups in the molecule, the methylol (ether) groups may be the same or different.

When the binder resin (B) has a carboxyl group, the methylol (ether) groups in the acid crosslinking agent react with carboxyl groups in the binder resin (B) in the presence of an acid generated from the thermally acid generating agent to form a crosslinking structure.

Illustrative examples of the acid crosslinking agent include melamines having alkoxymethyl groups such as N,N,N,N,N,N-hexa(alkoxymethyl)melamine represented by the following formula (8):

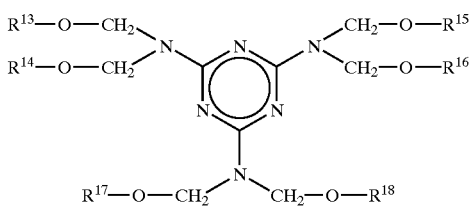

(8)

wherein $R^{13}$ to $R^{18}$ are each independently an alkyl group having preferably 1 to 6 carbon atoms, more preferably 1 to 4 carbon atoms, and glycolurils having alkoxymethyl groups such as N,N,N,N-tetra(alkoxymethyl)glycoluril represented by the following formula (9):

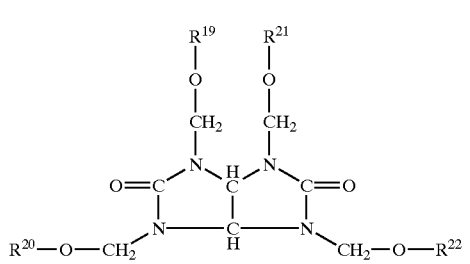

(8)

wherein $R^{19}$ to $R^{22}$ are each independently an alkyl group having preferably 1 to 6 carbon atoms, more preferably 1 to 4 carbon atoms.

Other acid crosslinking agents include an urea-formaldehyde resin, thiourea-formaldehyde resin, melamine-formaldehyde resin, guanamine-formaldehyde resin, benzoguanamine-formaldehyde resin, glycoluril-formaldehyde resin and compounds obtained by introducing a methylol(ether) group into polyvinylphenols.

These acid crosslinking agents may be used alone or in admixture of two or more.

Out of the above acid crosslinking agents, melamines having alkoxymethyl groups and glycolurils having alkoxymethyl groups are preferred, and melamines having alkoxymethyl groups are particularly preferred. An acid crosslinking agent prepared by mixing a melamine(α) having alkoxymethyl groups and a glycoluril(β) having alkoxymethyl groups in an [α/β] weight ratio of preferably 5/95 to 95/5, more preferably 10/90 to 90/10 is particularly preferred because a cured product having good balance between crosslinkability, heat resistance and solvent resistance and a low dielectric constant is obtained.

The ink jet color filter resin composition of the present invention has a contact angle between it and a bank formed from a resin composition for forming a color filter bank of 400 or more, preferably 50° or more. With this contact angle, the color mixing of the resin composition between pixel arrays can be eliminated and the amount of the resin composition which can be discharged into the light transmitting region can be increased to ensure the satisfactory color density of a pixel pattern.

Color Filter Production Process

A description is subsequently given of the process for producing a color filter from the ink jet color filter resin composition of the present invention by an ink jet system (to be simply referred to as "color filter production process" hereinafter) in present invention.

Figure 2:
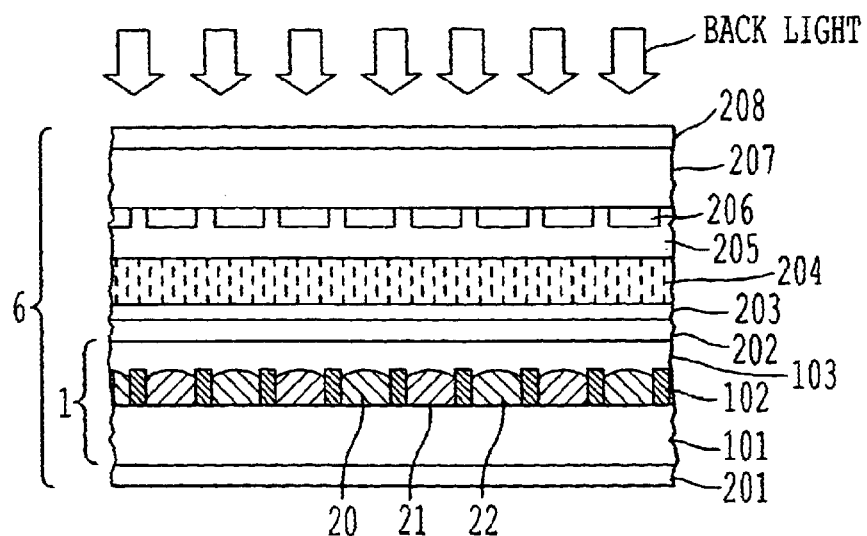
FIG. 2 is a longitudinal sectional view showing the key parts of an example of liquid crystal display having a color filter produced by the color filter production process of the present invention.

FIG. 2 is a longitudinal sectional view showing the key parts of an example of liquid crystal display having a color filter produced by the color filter production process of the present invention.

As shown in the figure, a color filter 1 basically comprises laminating a substrate 101, banks 102, pixel patterns 20 (for example, red), 21 (for example, green) and 22 (for example, blue) with a protective layer 103 for covering these pixel patterns. These constituent elements excluding the banks 102 transmit light but the banks 102 may transmit or shield light.

Further, the liquid crystal display 6 comprises laminating a polarizer 201 arranged on the exterior side of the substrate 101 and a common electrode 202, alignment film 203, liquid crystal layer 204, alignment film 205, pixel electrodes 206, substrate 207 and polarizer 208, all formed on the protective layer 103.

Any light transmitting material may be used as the material of the substrate 101 if it has heat resistance against heating conditions in the step of producing a color filter and predetermined mechanical strength. Examples of the light transmitting material include glass, silicon, polycarbonates, polyesters, aromatic polyamides, polyamide-imide, polyimides, norbornene-based ring-opening polymers and hydrides thereof. The substrate made from the material may be subjected to a chemical treatment with a silane coupling agent or the like, or a pre-treatment such as plasma treatment, ion plating, sputtering, vapor-phase reaction or vacuum deposition.

These materials may be used in the substrate 207 but the materials of the both substrates may be different as the case may be.

The banks 102 are made from an appropriate resin composition for forming a bank and partition the surface of the substrate 101 into a lattice form in the figure. The regions partitioned by the banks 102 are light transmitting regions for transmitting light. The shape of each region partitioned by the banks 102 may be changed as desired.

The resin composition used to form the banks 102 is (i) a radiation sensitive resin composition which comprises a binder resin, polyfunctional monomer and photopolymerization initiator and is cured by exposure to radiation or (ii) a radiation sensitive resin composition which comprises a binder resin, compound which generates an acid by exposure to radiation and crosslinkable compound which can be crosslinked by the function of an acid generated by exposure to radiation and is cured by exposure to radiation. These radiation sensitive resin compositions for forming a bank are generally mixed with a solvent to prepare a liquid composition before use. The solvent may be either a high-boiling solvent or a low-boiling solvent.

The radiation sensitive resin composition for forming a bank in the present invention is preferably a composition, as disclosed in JP-A 10-86456, which comprises (a) a copolymer of hexafluoropropylene, unsaturated carboxylic acid (anhydride) and other copolymerizable ethylenic unsaturated monomer, (b) a compound which generates an acid by exposure to radiation, (c) a crosslinkable compound which can be crosslinked by the function of an acid generated by exposure to radiation, (d) a fluorine-containing organic compound other than the component (a) and (e) a solvent which can dissolve the above components (a) to (d).

The pixel pattern 20 is formed from a color filter resin composition containing, for example, a red colorant, the pixel pattern 21 is formed from a color filter resin composition containing, for example, a green colorant, and the pixel pattern 22 is formed from a color filter resin composition containing, for example, a blue colorant. These pixel patterns are formed by an ink jet system which will be described hereinafter.

The total number of pixel patterns partitioned by the banks 102 is a number obtained by multiplying the number of pixel patterns for each color in the liquid crystal display by the number of primary colors (three colors, i.e., red, green and blue in the figure). For example, in the case of a VGA-based liquid crystal display used in an information terminal such as a personal computer, as the number of pixel patterns for each color is 640 rows×480 lines, the total number of pixel patterns is (640×480×3). The pitch of the pixel patterns is 100 μm, for example. In the figure, the number of pixel patterns is made small to make it easily understandable.

The protective layer 103 may be made from a material commonly used for the formation of a protective layer for a color filter but preferably a material which is cured by the function of light or heat, or both so that a general-purpose exposure apparatus, baking furnace or hot plate can be used. This makes it possible to reduce equipment cost or save space.

Further, the common electrode 202 can be made from a material having light permeability and conductivity, for example, ITO (indium tin oxide) by a commonly used processing method. The alignment films 203 and 205 can be formed by rubbing a film formed from an appropriate liquid crystal alignment agent and have the function of aligning liquid crystal molecules in a certain direction.

The liquid crystal layer 204 is formed from polarized liquid crystal molecules whose alignment direction can be controlled by the application of voltage.

Figure 4:
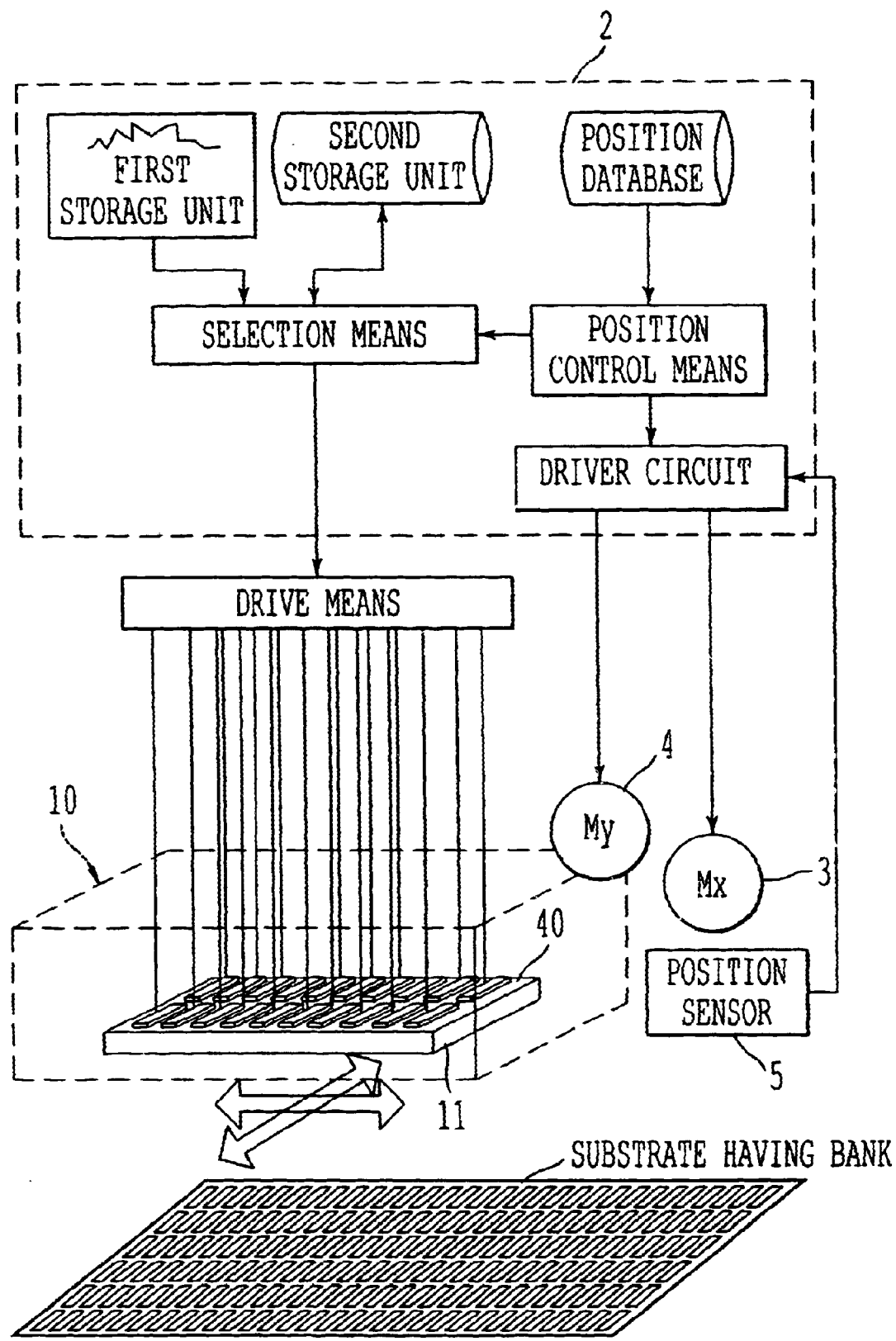
FIG. 4 is a diagram outlining a color filter production apparatus used in the color filter production process of the present invention.

The pixel electrodes 206 are arranged corresponding to the pixel patterns of the color filter 1 and connected to the respective output terminals of drive means (see FIG. 4). The pixel electrodes 206 are also made from a material having light permeability and conductivity which may be the same as that of the common electrode 202 or different from that of the common electrode 202 as the case may be. TFT (thin film transistor), TFD (thin film diode) or the like may be used as the above drive means.

The polarizers 201 and 208 are laminated on the exterior sides of the substrates 101 and 207, respectively. These polarizers transmit only specific polarized light out of back light irradiated from the back of the liquid crystal display 6. These two polarizers are arranged so that the polarizing directions of light beams which have transmitted therethrough are shifted at a polarization rotation angle which is given to light by liquid crystal molecules when voltage is not applied to the liquid crystal layer 204.

A description is subsequently given of the color filter production process with reference to FIG. 1 and FIG. 3.

Only the process for producing the color filter 1 out of the liquid crystal display 6 will be described hereinunder. Known technologies may be applied in the production of the other constituents parts of the liquid crystal display 6.

Figure 3:
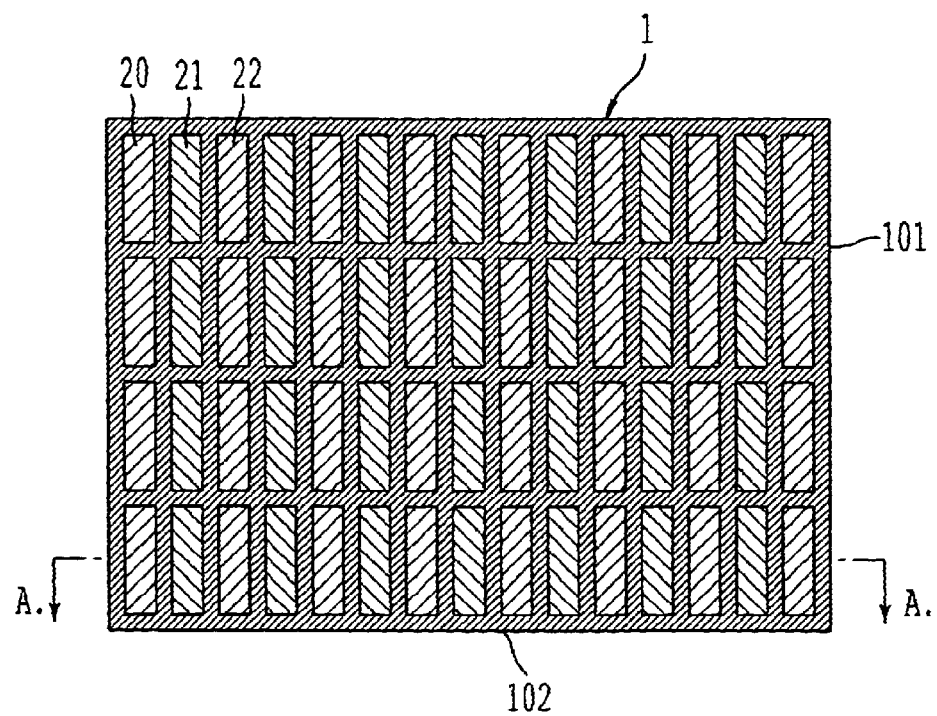
FIG. 3 is a plan view of a color filter produced by the color filter production process of the present invention.

FIG. 1 is a longitudinal sectional view showing the key parts of an example of process for producing the color filter 1, cut on line A—A of FIG. 3. FIG. 3 is a plan view of the color filter 1.

After the radiation sensitive resin composition for forming a bank is applied to the substrate 101 as a solution, it is prebaked (PB) to evaporate the solvent so as to form a coating film. The prebaking conditions include a heating temperature of 50 to 150° C. and a heating time of 30 to 60 sec.

Thereafter, the coating film is exposed to radiation through a photomask, post-exposure baked (PEB) and developed with an alkali developer to dissolve and remove radiation unexposed portions of the coating film. Thereby, a substrate 101 having a predetermined bank pattern with a predetermined alignment defined by the banks 102 and a large number of light transmitting regions 105 for transmitting light formed on the surface is obtained as shown in FIG. 1(*a*). PEB conditions in this case include a heating temperature of about 50 to 150° C., a heating time of about 30 to 600 sec and an irradiation dose of about 1 to 500 mJ/cm$^2$. The development time is about 10 to 300 sec and the development method is puddle development, dipping development, vibration immersion development or the like. After development, post-baking may be carried out at a heating temperature of about 150 to 280° C. for a heating time of about 3 minutes to 2 hours.

Subsequently, as shown in FIG. 1(*b*), the ink jet color filter resin composition is discharged into each light transmitting region 105 from an ink jet head 10 to be stored in each light transmitting region 105 such that the top surface of the resin composition rises above the upper end of the bank 102 so as to form the storage layers 21, 22, of the resin composition. Reference numeral 20 denotes the resin composition being discharged. The discharge rate of the resin composition is about 0.01 to 100 m/sec, for example.

As shown in FIG. 1(*c*), the resin composition of each storage layer is dried by heating to evaporate the solvent so as to form pixel patterns 20, 21, 22, . . . having a predetermined thickness. The volume of each storage layer is reduced by this treatment. The heat treatment in this case is carried out by heating the whole substrate at a predetermined temperature (for example, 50° C.) with a heater.

After the substrate is exposed to radiation as the case may be, it is heated at a predetermined temperature (for example, about 150 to 280° C.) for a predetermined time (for example, about 3 minutes to 2 hours) to completely dry and crosslink the resin composition. The irradiation dose in this case is about 1 to 500 mJ/cm$^2$ in this case.

For the formation of the pixel patterns 20, 21, 22, . . . , red, green and blue resin compositions are used sequentially to form three red, green and blue primary color pixel arrays on the substrate 101.

Thereafter, as shown in FIG. 1(*d*), a protective layer 103 is formed from an appropriate resin to protect and cover the formed pixel patterns and flatten the surface of the color filter.

Further, as shown in FIG. 1(*e*), a light permeable and conductive material (for example, ITO) is used to form a common electrode 202 on the protective layer 103 by sputtering or vapor deposition. To form the common electrode 202 pattern, the common electrode 202 is etched in accordance with the pattern shape of other constituent part such as the pixel electrodes 206.

The color filter 1 can be produced through the above steps.

Thereafter, as shown in FIG. 2, an alignment film 203, liquid crystal layer 204 and alignment film 205 are formed sequentially between the color filter 1 and the substrate 207 having pixel electrodes 206, and polarizers 201 and 208 are laminated on the both exterior sides to produce the liquid crystal display 6.

To coat the radiation sensitive resin composition for forming a bank on the substrate 101, rotation coating, cast coating, roll coating or the like may be employed. The thickness of the coating film after prebaking is preferably 0.1 to 10 μm, more preferably 0.5 to 3.0 μm.

Radiation used to form the banks 102 and the pixel patterns 20, 21, 22, . . . is visible radiation, ultraviolet radiation, far ultraviolet radiation, X-radiation, electron beams or the like but preferably radiation having a wavelength of 190 to 450 nm.

The alkali developer used to form the banks 102 is preferably an aqueous solution of sodium carbonate, sodium hydroxide, potassium hydroxide, silicon sodium, metasilicon sodium, ammonia water, ethylamine, n-propylamine, diethylamine, di-n-propylamine, triethylamine, methyldiethylamine, dimethylethanolamine, triethanolamine, tetramethylammonium hydroxide, tetraethylammonium hydroxide, choline, pyrrole, piperidine, 1,8-diazabicyclo[5.4.0]-7-undecene or 1,5-diazabicyclo[4.3.0]-5-nonene.

A water-soluble organic solvent such as methanol or ethanol and a surfactant may be added to the alkali developer in appropriate amounts. After development with an alkali developer, the substrate is preferably washed with water.

FIG. 4 outlines a color filter production apparatus used in the color filter production process of the present invention.

This color filter production apparatus comprises a control unit 2 for controlling the ink jet head 10, motors 3 and 4 and a position sensor 5.

The ink jet head 10 discharges the supplied color filter resin composition from its nozzles. It is not limited to a particular type but may be of a known ink jet system. Since the color filter resin composition is used in the present invention, the ink jet head 10 is preferably of a piezo jet system which does not cause heat to act on the resin composition in order to prevent the material from being impaired.

An N number (N is an arbitrary number) of piezoelectric elements 40 for discharging the color filter resin composition are provided on the piezo jet ink jet head 10. The piezoelectric elements 40 can be driven or not driven independently.

Figure 5:
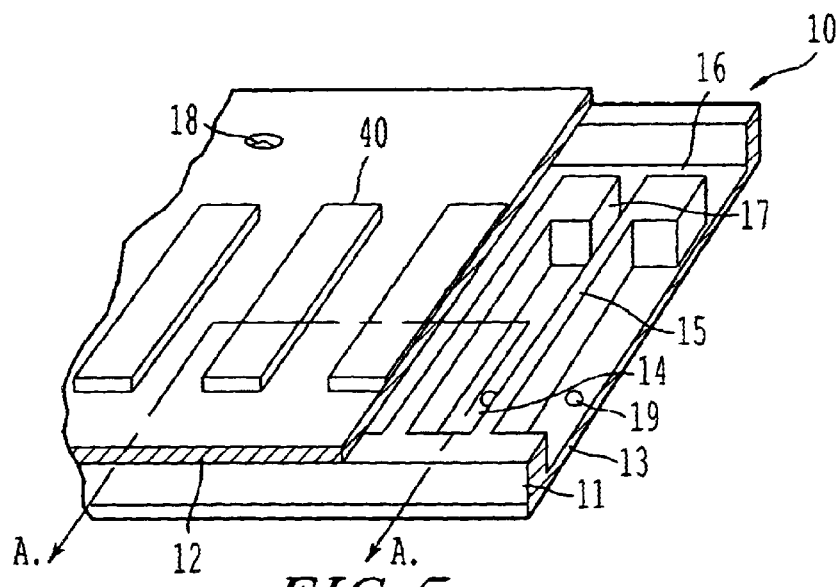
FIG. 5 is a partial sectional view showing the key parts of an ink jet head used in the color filter production process of the present invention.

FIG. 5 is a partially broken view of key parts of the ink jet head 10.

The ink jet head 10 mainly consists of a pressure chamber substrate 11, vibration plate 12 and nozzle plate 13. The vibration plate 12 is provided on one side of the pressure chamber substrate 11 and the nozzle plate 13 is provided on the other side of the pressure chamber substrate 11.

Pressure chambers 14, side walls 15, reservoir 16, feed ports 17 and the like are formed on the pressure chamber substrate 11 by etching a silicon substrate, for example. The piezoelectric elements 40 provided on the vibration plate 12 and the pressure chambers 14 are aligned with each other so that the volume of the pressure chamber 14 is changed by the deformation of the vibration plate 12.

The vibration plate 12 is an elastic film made from a ceramic or the like, has the piezoelectric elements 40 arranged in a row and is deformed by the distortion of the piezoelectric elements 40. An ink tank port 18 is formed in the vibration plate 12 to supply the color filter resin composition stored in an unshown ink tank into the pressure chamber substrate 11 and the color filter resin composition supplied into the pressure chamber substrate 11 flows from the reservoir 16 to the feed ports 17 and the pressure chambers 14. The piezoelectric elements 40 are constructed by supporting piezoelectric ceramic crystals with electrodes.

Nozzles 19 corresponding to the number of pressure chambers 14 are formed in the nozzle plate to discharge the color filter resin composition.

The ink jet heads 10 correspond to the number of kinds of color filter resin compositions. Actually, red, green and blue ink jet heads 10 are used. Only one ink jet head 10 is shown to make it easily understandable.

In the ink jet head 10, only a piezoelectric element 40 connected to a drive circuit to which voltage has been applied is distorted, the vibration plate 12 is deformed, pressure is applied to the pressure chamber 14 corresponding to the piezoelectric element, and the color filter resin composition is discharged from the nozzle 19. Since piezoelectric elements 40 to which voltage has not been applied are not distorted, the resin composition in the pressure chambers 14 corresponding to the piezoelectric elements 40 is not discharged. Therefore, a single work unit consists of a set of a piezoelectric element 40, a pressure chamber 14 and a nozzle 19.

Figure 6:
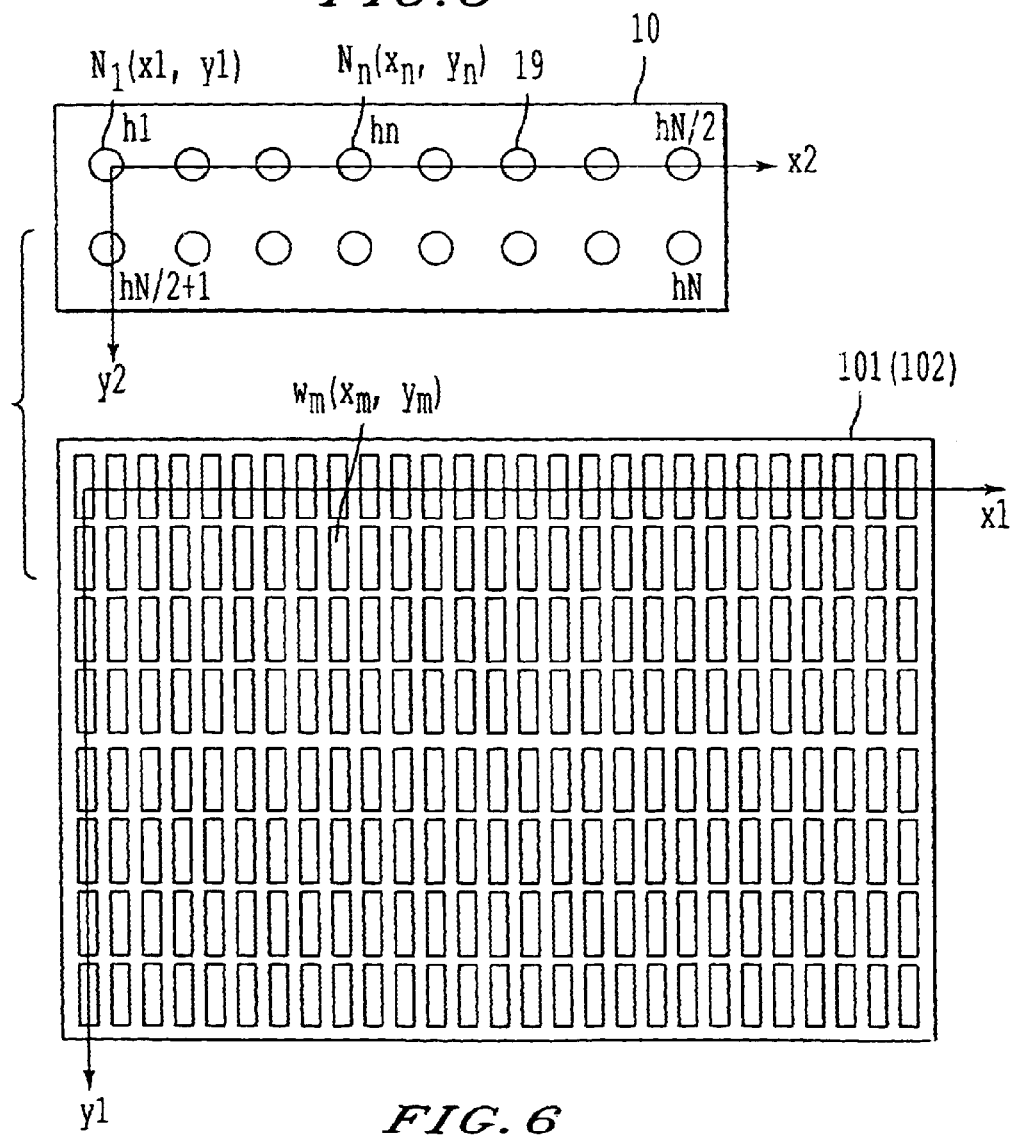
FIG. 6 is a plan view showing the arrangement of nozzles in an ink jet head and filter elements on a substrate having banks formed thereon used in the color filter production process of the present invention.

Further, FIG. 6 is a plan view showing the arrangement of the nozzles 19 of the ink jet head 10 and filter elements on the substrate 101 having the banks 102 as the base of the color filter.

An N number of nozzles are numbered hn (n is from 1 to N) and the position Nn (xn, yn) of each nozzle 19 is specified by the x2 axis and the y2 axis of relative coordinates.

The minimum pixel element defined by the lattice of the banks 102 is called "filter element" and shaped like a window having a width of 300 μm in the x1 axis (transverse) direction and a length of 100 μm in the y1 axis (longitudinal) direction, and the position Wm (xm, ym) (m is from 1 to the largest number of filter elements) of each filter element on the substrate having banks formed thereon is specified by the x1 axis and the y1 axis of relative coordinates.

The pitch of the nozzles 19 is set to a multiple of the integer of the pitch of filter elements in the x1 axis direction. For example, when 60 nozzles 19 are formed in the ink jet head 10, three drops of the color filter resin composition are discharged to one filter element and the ink jet head 10 is operated at a drive frequency of 14.4 kHz, the resin composition corresponding to 900,000 pixels×3 drops (14,400/second×60) can be stored in a 10-inch VGA-based color filter having about 900,000 pixels in about 3 seconds. Since the transfer time of the ink jet head 10 must be taken into consideration, the resin composition can be actually stored in all the filter elements in less than 1 minute.

This color filter production process is simple, inexpensive and extremely advantageous industrially. In the present invention, the operation of forming pixel patterns is made extremely advantageous industrially by using the ink jet color filter resin composition containing a high-boiling solvent as described above.

A color filter produced by the above color filter production process is extremely useful for color liquid crystal displays, color image pick-up elements, color sensors and the like as an additive color mixture type or subtractive color mixture type color filter.

The following examples are provided for the purpose of further illustrating the present invention but are in no way to be taken as limiting.

EXAMPLE 1

(1) 100 parts by weight of C.I. Pigment Red 254 as the component (A), 50 parts by weight of a copolymer of methacrylic acid/ benzyl methacrylate/ polystyrene macromonomer (weight ratio=25/65/10, weight average molecular weight=30,0000) as the component (B), 50 parts by weight of dipentaerythritol pentaacrylate as a polyfunctional monomer, 10 parts by weight of 2,2'-bis(2-chlorophenyl)-4,4',5,5'-tetrakis(4-ethoxycarbonylphenyl)-1,2'-biimidazole and 10 parts by weight of 4,4'-bis(diethylamino)benzophenone as photopolymerization initiators and 1,700 parts by weight of tetraethylene glycol dimethyl ether as the component (C) were mixed together to prepare a red colored ink jet color filter resin composition (to be referred to as "resin composition (R1)", hereinafter).

Separately, a radiation sensitive resin composition was applied to the surface of a soda glass transparent substrate having a silica ($SiO_2$) film for preventing the elution of sodium ions formed on the surface and prebaked on a hot plate at 110° C. for 2 minutes to evaporate the solvent so as to form a coating film. Thereafter, the coating film was exposed to radiation with an irradiation dose of 150 mJ/cm$^2$ through a photomask, post-exposure baked at 110° C. for 2 minutes and developed with an alkali developer at 25° C. for 1 minute to dissolve and remove radiation unexposed portions of the coating film so as to form a bank pattern for defining portions forming a pixel pattern.

Subsequently, the resin composition (R1) was discharged into the inside of the bank pattern by an ink jet system at a rate of 7 m/sec in such a manner that the top surface of the resin composition (R1) became higher than the height of the bank, pre-baked on a hot plate at 200° C. for 2 minutes to evaporate the solvent and flatten the rising portion of the resin composition (R1), and post-baked in an oven heated at 200° C. for 1 hour to obtain a color filter having red pixel arrays arranged on the substrate.

The obtained color filter was excellent in the surface smoothness of pixels, had a pixel thickness nonuniformity of less than 5% and was free from color shading.

The contact angle (value measured in less than 1 minute from the time when the resin composition contacted the surface of the substrate) between the bank and the resin composition (R1) was about 50°.

(2) The radiation sensitive resin composition used to form the above bank pattern was prepared as follows.

After the inside of a 0.5-liter stainless steel autoclave equipped with an electromagnetic stirrer was completely substituted by nitrogen gas, 270 g of ethyl acetate, 16.3 g of ethylvinyl ether (EVE), 40.3 g of crotonic acid (CA), 19.7 g of heptafuorobutylvinyl ether and 5.4 g of lauroyl peroxide were charged into the autoclave and cooled to −50° C. with dry ice-methanol, and oxygen in the system was removed with nitrogen gas again. Thereafter, 117 g of hexafluoropropylene (HFP) was charged into the autoclave and the temperature was started to be increased. The pressure was 8.2 kgf/cm$^2$ when the temperature in the autoclave reached 70° C. Thereafter, a reaction was continued at 70° C. for 12 hours under agitation and the autoclave was cooled with water when the pressure was reduced to 7.5 kgf/cm$^2$ to stop the reaction. After room temperature was reached, an unreacted monomer was discharged, the autoclave was opened and a polymer solution having a solid content of 16.0% was obtained. The obtained polymer solution was added to water to deposit the polymer which was then purified by re-precipitation with n-hexane and vacuum dried at 50° C. to obtain 80 g of a fluorine-containing copolymer.

When the obtained fluorine-containing copolymer was measured for its number average molecular weight in terms of polystyrene with the SYSTEM-21 GPC chromatograph of Showa Denko K.K., it was 1,900.

100 parts by weight of this fluorine-containing copolymer, 5 parts by weight of 2-piperonyl-bis(4,6-trichloromethyl)-s-triazine, 20 parts by weight of the Cymel 300 which is a hexamethoxymethylol melamine resin and 6 parts by weight of the Megafac F172 (of Dainippon Ink and Chemicals, Inc.; oligomer containing a perfluoroalkyl group and a lipophilic group) were dissolved in diethylene glycol ethyl methyl ether to a solid content of 40% and the mixture was filtered with a membrane filter having a pore diameter of 0.2 μm to prepare a solution of the above radiation sensitive resin composition.

EXAMPLE 2

100 parts by weight of C.I. Pigment Red 254 as the component (A), 50 parts by weight of a copolymer of methacrylic acid/ benzyl methacrylate/ polystyrene macromonomer (weight ratio=25/65/10, weight average molecular weight=30,0000) as the component (B), 50 parts by weight of dipentaerythritol pentaacrylate as a polyfunctional monomer and 1,700 parts by weight of tetraethylene glycol dimethyl ether as the component (C) were mixed together to prepare a red colored ink jet color filter resin composition (to be referred to as "resin composition (R2)" hereinafter).

Separately, a bank pattern was formed on the surface of a soda glass transparent substrate having a silica ($SiO_2$) film for preventing the elution of sodium ions on the surface in the same manner as in Example 1.

A color filter having red pixel arrays arranged on the substrate was produced from the resin composition (R2) by an ink jet system in the same manner as in Example 1.

The obtained color filter was excellent in the surface smoothness of pixels, had a pixel thickness nonuniformity of less than 5% and was free from color shading.

The contact angle (value measured in less than 1 minute from the time when the resin composition contacted the surface of the substrate) between the bank and the resin composition (R2) was about 50°.

EXAMPLE 3

A resin composition (R3) was prepared in the same manner as in Example 1 except that 10 parts by weight of 2,2'-bis(2,4-dichlorophenyl)-4,4',5,5'-tetraphenyl-1,2'-biimidazole, 10 parts by weight of 4,4'-bis(diethylamino)benzophenone and 50 parts by weight of 2-benzyl-2-dimethylamino-1-(4-morpholinophenyl)butan-1-one were used as photopolymerization initiators in place of 10 parts by weight of 2,2'-bis(2-chlorophenyl)-4,4',5,5'-tetrakis(4-ethoxycarbonylphenyl)-1,2'-biimidazole and 10 parts by weight of 4,4'-bis(diethylamino)benzophenone and evaluated in the same manner as in Example 1. The same evaluation results as in Example 1 were obtained.

EXAMPLE 4

A resin composition (R4) was prepared in the same manner as in Example 1 except that 1,700 parts by weight of butylcarbitol acetate was used in place of 1,700 parts by weight of tetraethylene glycol dimethyl ether and evaluated in the same manner as in Example 1. The same evaluation results as in Example 1 were obtained.

Comparative Example 1

100 parts by weight of C.I. Pigment Red 254 as the component (A), 50 parts by weight of a copolymer of methacrylic acid/ benzyl methacrylate/ polystyrene macromonomer (weight ratio=25/65/10, weight average molecular weight=30,000) as the component (B), 50 parts by weight of dipentaerythritol pentaacrylate as a polyfunctional monomer, 10 parts by weight of 2,2'-bis(2-chlorophenyl)-4,4',5,5'-tetrakis(4-ethoxycarbonylphenyl)-1,2'-biimidazole and 10 parts by weight of 4,4'-bis(diethylamino) benzophenone as photopolymerization initiators and 1,700 parts by weight of ethyl 3-ethoxypropionate (boiling point of 170° C.) as a solvent were mixed together to prepare a red colored resin composition (to be referred to as "resin composition (r1)" hereinafter).

Separately, a bank pattern was formed on the surface of a soda glass transparent substrate having a silica ($SiO_2$) film for preventing the elution of sodium ions on the surface in the same manner as in Example 1.

A color filter having red pixel arrays arranged on the substrate was produced from the resin composition (r1) by an ink jet system in the same manner as in Example 1. When the resin composition (r1) was discharged into the inside of the bank pattern, the ink jet stability was unsatisfactory and the resin composition (r1) was forced out from the regions where the bank pattern was formed on the substrate. The obtained color filter was inferior in the surface smoothness of pixels and had color shading.

The ink jet color filter resin composition of the present invention contains a high-boiling solvent as the component (C), the pixel pattern forming method is limited to an ink jet system, and the color filter production process of the present invention comprises the step of forming a pixel pattern from the ink jet color filter resin composition by an ink jet system.

Therefore, these inventions have the following marked effects.
(1) Since the evaporation speed of the solvent is low when the pixel pattern is formed and the shape of the top surface of the discharged color filter resin composition is not changed drastically at the time of drying, the work margin at the time of forming the pixel pattern improves.
(2) A change in viscosity by the evaporation of the solvent when the pixel pattern is formed by an ink jet system can be minimized and a pixel pattern having a desired shape can be formed with ease.
(3) Since the ink jet head can be prevented from being clogged by drying and excellent linearity can be secured when the color filter resin composition is discharged, the use efficiency of the color filter resin composition and the cleaning efficiency of the color filter production apparatus improve. Therefore, an excellent color filter can be produced by the simple pixel pattern forming step at a low cost.

Comparative Example 2

A resin composition (r2) was prepared in the same manner as in Comparative Example 1 except that 10 parts by weight of 2,2'-bis(2,4-dichlorophenyl)-4,4',5,5'-tetraphenyl-1,2'-biimidazole, 10 parts by weight of 4,4'-bis(diethylamino)benzophenone and 50 parts by weight of 2-benzyl-2-dimethylamino-1-(4-morpholinophenyl)butan-1-one were used as photopolymerization initiators in place of 10 parts by weight of 2,2'-bis(2-chlorophenyl)-4,4',5,5'-tetrakis(4-ethoxycarbonylphenyl)-1,2'-biimidazole and 10 parts by weight of 4,4'-bis(diethylamino)benzophenone and evaluated in the same manner as in Comparative Example 1. The same evaluation results as in Comparative Example 1 were obtained.

What is claimed is:

1. A process for producing a color filter by an ink jet system, which comprises the step of discharging a resin composition from an ink jet head into light transmitting regions on the surface of a transparent substrate having banks formed thereon to store the resin composition in the light transmitting regions defined by the banks, said resin composition comprising (A) a colorant, (B) a binder resin, and (C) a solvent having a boiling point of 245° C. or more at normal pressure, and optionally, an organic solvent having a boiling point lower than 245° C. at normal pressure as the sole solvents in the resin composition;

the step of forming a pixel pattern by drying the resin composition stored in the light transmitting regions; and the step of forming a protective layer to cover the pixel pattern, wherein the solvent having a boiling point of 245° C. or more at normal pressure is selected from the group consisting of diethylene glycol dialkyl ether-based solvents represented by the formula $R^1$—O(CH$_2$CH$_2$O)$_2$—$R^2$, wherein $R^1$ and $R^2$ are each independently an alkyl group having 4 to 10 carbon atoms; triethylene glycol dialkyl ether-based solvents represented by the formula $R^3$—O(CH$_2$CH$_2$O)$_3$—$R^4$, wherein $R^3$ and $R^4$ are each independently an alkyl group having 1 to 10 carbon atoms; polyethylene glycol dialkyl ether-based solvents represented by the formula $R^5$—O(CH$_2$CH$_2$O)$_i$—$R^6$, wherein $R^5$ and $R^6$ are each independently an alkyl group having 1 to 10 carbon atoms, and i is an integer of 4 to 30; propylene glycol dialkyl ether-based solvents represented by the formula $R^7$—OCH(CH$_3$)CH$_2$O—$R^8$, wherein $R^7$ and $R^8$ are each independently an alkyl group having 4 to 10 carbon atoms; glycerin triacetate; di-n-butyl maleate; di-n-butyl fumarate; n-butyl benzoate; dimethyl phthalate; diethyl phthalate; di-n-propyl phthalate; di-i-propyl phthalate; di-n-butyl phthalate and i-amyl salicylate.

2. The process of claim 1, wherein the resin composition has a contact angle between it and a bank formed from a resin composition for forming the bank of 40° or more.

3. The process of claim 1, wherein the component (A) is an organic pigment or inorganic pigment.

4. The process of claim 1, wherein the binder resin (B)$^R_P$ copolymer (B1) is at least one selected from the group consisting of a copolymer of methacrylic acid and benzyl methacrylate, copolymer of methacrylic acid, styrene and methyl methacrylate, copolymer of methacrylic acid, styrene and benzyl methacrylate, copolymer of methacrylic acid, methyl methacrylate and polystyrene macromonomer, copolymer of methacrylic acid, methyl methacrylate and polymethyl methacrylate macromonomer, copolymer of methacrylic acid, benzyl methacrylate and polystyrene macromonomer, copolymer of methacrylic acid, benzyl methacrylate and polymethyl methacrylate macromonomer, copolymer of methacrylic acid, 2-hydroxyethyl methacrylate, benzyl methacrylate and polystyrene macromonomer and copolymer of methacrylic acid, 2-hydroxyethyl methacrylate, benzyl methacrylate and polymethyl methacrylate macromonomer.

5. The process of claim 1, wherein the binder resin (B) is at least one selected from the group consisting of a copolymer of N-phenylmaleimide, methacrylic acid, styrene and allyl acrylate, copolymer of N-phenylmaleimide, methacrylic acid, styrene and allyl methacrylate, copolymer of N-phenylmaleimide, methacrylic acid, styrene and benzyl methacrylate, copolymer of N-phenylmaleimide, methacrylic acid, styrene and phenyl methacrylate, copolymer of N-phenylmaleimide, methacrylic acid, styrene, benzyl methacrylate and polystyrene macromonomer, copolymer of N-phenylmaleimide, methacrylic acid, styrene, benzyl methacrylate and polymethyl methacrylate macromonomer, copolymer of N-phenylmaleimide, methacrylic acid, styrene, phenyl methacrylate and polystyrene macromonomer, copolymer of N-phenylmaleimide, methacrylic acid, styrene, phenyl methacrylate and polymethyl methacrylate macromonomer, copolymer of N-phenylmaleimide, methacrylic acid, styrene, 2-hydroxyethyl methacrylate, benzyl methacrylate and polystyrene macromonomer, copolymer of N-phenylmaleimide, methacrylic acid, styrene, 2-hydroxyethyl methacrylate, benzyl methacrylate and polymethyl methacrylate macromonomer, copolymer of N-phenylmaleimide, methacrylic acid, styrene, 2-hydroxyethyl methacrylate, phenyl methacrylate and polystyrene macromonomer, and copolymer of N-phenylmaleimide, methacrylic acid, styrene, 2-hydroxyethyl methacrylate, phenyl methacrylate and polymethyl methacrylate macromonomer.

6. The process of claim 1, wherein the component (C) has a boiling point of 245 to 290° C. at normal pressure.

7. The process of claim 1, wherein the resin composition further contains at least one polyfunctional monomer selected from the group consisting of trimethylolpropane triacrylate, dipentaerythritol pentaacrylate and dipentaerythritol hexaacrylate.

8. The process of claim 1, wherein the resin composition further contains at least one photopolymerization initiator selected from the group consisting of a combination of 2,2'-bis(2-chlorophenyl)-4,4',5,5'-tetrakis(4-ethoxycarbonylphenyl)biimidazole and 4,4'-bis(diethylamino)benzophenone, a combination of 2,2'-bis(2-chlorophenyl)-4,4',5,5'-tetrakis(4-ethoxycarbonylphenyl)biimidazole, 4,4'-bis(diethylamino)benzophenone and 2-benzyl-2-dimethylamino-1-(4-morpholino-phenyl)butan-1-one, a combination of 2,2'-bis(2-chlorophenyl)-4,4',5,5'-tetrakis(4-ethoxycarbonylphenyl)biimidazole, 4,4'-bis(diethylamino)benzophenone and 1-hydroxycyclohexylphenyl ketone, a combination of 2,2'-bis(2-chlorophenyl)-4,4',5,5'-tetrakis(4-ethoxycarbonylphenyl)biimidazole, 4,4'-bis(dimethylamino)benzophenone, 1-hydroxycyclohexylphenyl ketone and 2-mercaptobenzothiazole, a combination of 2,2'-bis(2,4-dichlorophenyl)-4,4',5,5'-tetraphenylbiimidazole and 4,4'-bis(diethylamino)-benzophenone, a combination of 2,2'-bis(2,4-dibromophenyl)-4,4',5,5'-tetraphenylbiimidazole, 4,4'-bis(diethylamino)benzophenone and 2-benzyl-2-dimethylamino-1-(4-morpholinophenyl)butan-1-one, a combination of 2,2'-bis(2,4-dibromophenyl)-4,4',5,5'-tetraphenylbiimidazole, 4,4'-bis(diethylamino)benzophenone and 1-hydroxycyclohexylphenyl ketone, and a combination of 2,2'-bis(2,4,6-trichlorophenyl)-4,4',5,5'-tetraphenylbiimidazole, 4,4'-bis(dimethylamino)benzophenone, 1-hydroxycyclohexylphenyl ketone and 2-mercaptobenzothiazole.

9. A color filter which is prepared by the process of claim 1.

10. The process of claim 1, wherein said solvent having a boiling point lower than 245° C. is present in an amount of 20 wt % or less based on the total amount of solvent (C).

11. The process of claim 1, wherein said solvent having a boiling point lower than 245° C. is present in an amount of 5 wt % or less based on the total amount of solvent (C).

12. The process of claim 1, wherein the binder resin is at least one copolymer selected from the group consisting of a carboxyl group-containing copolymer (B1) and an N-substituted maleimide copolymer (B2).

13. The process of 12, wherein the solvent is tetraethylene glycol dimethyl ether.

14. The process of claim 1, wherein the solvent is tetraethylene glycol dimethyl ether.

\* \* \* \* \*